[19] United States Patent
Chen et al.

(10) Patent No.: US 8,938,767 B2
(45) Date of Patent: Jan. 20, 2015

(54) STREAMING ENCODED VIDEO DATA

(75) Inventors: Ying Chen, San Diego, CA (US); Marta Karczewicz, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 9 days.

(21) Appl. No.: 13/083,443

(22) Filed: Apr. 8, 2011

(65) Prior Publication Data

US 2011/0196982 A1 Aug. 11, 2011

Related U.S. Application Data

(63) Continuation of application No. 12/785,770, filed on May 24, 2010.

(60) Provisional application No. 61/255,767, filed on Oct. 28, 2009.

(51) Int. Cl.
*H04N 7/173* (2011.01)
*H04N 21/845* (2011.01)
(Continued)

(52) U.S. Cl.
CPC ......... *H04N 21/454* (2013.01); *H04N 21/8456* (2013.01); *H04L 29/06176* (2013.01);
(Continued)

(58) Field of Classification Search
CPC ............... H04N 21/23439; H04N 21/4516; H04N 21/454; H04N 21/4621; H04N 21/44209; H04N 21/85406; H04N 21/8456; H04L 29/06176; H04L 65/4054
USPC ...................................................... 725/105
See application file for complete search history.

(56) References Cited

U.S. PATENT DOCUMENTS 6,493,874 B2 12/2002 Humpleman
7,478,164 B1 * 1/2009 Lango et al. .................. 709/231
(Continued)

FOREIGN PATENT DOCUMENTS

EP 1298931 A2 4/2003
EP 1298931 A2 4/2003
(Continued)

OTHER PUBLICATIONS

Fielding et al., "Hypertext Transfer Protocol—HTTP/1.1.", RFC 2068, UC Irvine, DEC, and MIT/LCS, Jan. 1997.*
(Continued)

*Primary Examiner* — Nasser Goodarzi
*Assistant Examiner* — Michael B Pierorazio
(74) *Attorney, Agent, or Firm* — Brent A. Boyd

(57) ABSTRACT

A source device may signal characteristics of a media presentation description (MPD) file such that a destination device may select one of a number of presentations corresponding to the MPD file and retrieve one or more video files of the selected presentation. In one example, an apparatus for transporting encoded video data includes a management unit configured to receive encoded video data comprising a number of video segments and forms a presentation comprising a number of video files, each of the video files corresponding to a respective one of the video segments, and a network interface configured to, in response to a request specifying a temporal section of the video data, output at least one of the video files corresponding to the number of video segments of the requested temporal section. A client may request temporally sequential fragments from different ones of the presentations.

32 Claims, 7 Drawing Sheets

(51) Int. Cl.
*H04N 21/854* (2011.01)
*H04N 21/45* (2011.01)
*H04N 21/2343* (2011.01)
*H04N 21/462* (2011.01)
*H04N 21/454* (2011.01)
*H04N 21/442* (2011.01)
*H04L 29/06* (2006.01)

(52) U.S. Cl.
CPC ..... *H04N21/85406* (2013.01); *H04N 21/8455* (2013.01); *H04N 21/4516* (2013.01); *H04L 65/4084* (2013.01); *H04N 21/23439* (2013.01); *H04N 21/4621* (2013.01); *H04N 21/44209* (2013.01)
USPC .......................................... 725/105; 709/231

(56) References Cited

U.S. PATENT DOCUMENTS

| | | | |
|---|---|---|---|
| 7,783,773 B2* | 8/2010 | Wu et al. | 709/231 |
| 8,078,744 B2 | 12/2011 | Kim et al. | |
| 2003/0055995 A1* | 3/2003 | Ala-Honkola | 709/231 |
| 2005/0050403 A1 | 3/2005 | Glaser et al. | |
| 2005/0102371 A1 | 5/2005 | Aksu | |
| 2005/0120132 A1* | 6/2005 | Hutter | 709/234 |
| 2005/0135285 A1 | 6/2005 | Vlot | |
| 2005/0254575 A1 | 11/2005 | Hannuksela et al. | |
| 2007/0016549 A1* | 1/2007 | Whitcher | 707/1 |
| 2007/0260968 A1* | 11/2007 | Howard et al. | 715/500.1 |
| 2008/0022005 A1* | 1/2008 | Wu et al. | 709/231 |
| 2008/0170630 A1 | 7/2008 | Falik et al. | |
| 2010/0235472 A1* | 9/2010 | Sood et al. | 709/219 |
| 2010/0312828 A1* | 12/2010 | Besserglick et al. | 709/203 |
| 2011/0023076 A1* | 1/2011 | Park et al. | 725/116 |
| 2011/0058675 A1* | 3/2011 | Brueck et al. | 380/277 |
| 2011/0082914 A1* | 4/2011 | Robert et al. | 709/219 |
| 2011/0099594 A1* | 4/2011 | Chen et al. | 725/105 |
| 2012/0036544 A1 | 2/2012 | Chen et al. | |

FOREIGN PATENT DOCUMENTS

| | | |
|---|---|---|
| JP | 2007520109 A | 7/2007 |
| WO | WO-2005064945 A1 | 7/2005 |

OTHER PUBLICATIONS

Pantos, "HTTP Live Streaming", Internet Draft 00, Apple Inc., May 1, 2009.*

3GPP, "Transparent end-to-end packet switched streaming service (PSS): 3GPP file format (3GP)," 3GPP TS 26.244, version 9.0.0, Release 9, Sophia Antipolis, Valbonne, FR, 55 pp.

3GPP, "Transparent end-to-end packet-switched streaming service (PSS): Protocols and codecs (Release 9)," 3GPP TS 26.234, version 9.1 .0, Release 9, Sophia Antipolis, Valbonne, FR, 179 pp.

Fielding et al., "Hypertext Transfer Protocol—HTTP/1.1," Network Working Group, RFC 2616, Jun. 1999, 165 pp.

Huawei Technologies Co et al: "Storage for HTTP Streaming", 3GPP Draft; S4-090651 Storage for HTTP Streaming, 3rd Generation Partnership Project (3GPP), Mobile Competence Centre 650, Route Des Lucioles ; F-06921 Sophia-Antipolis Cedex ; France, no. Kista; 20090812, Aug. 12, 2009, XP050356928, [retrieved on Aug. 12, 2009] the whole document.

Huawei Technologies Co et al: "Two Solutions for Client-enhanced HTTP Streaming", 3GPP Draft; S4-AHI063, no. Seattle, WA, USA; 20091001 PAN-S4-AHI063, Sep. 23, 2009, XP050398754, [retrieved on Sep. 23, 2009] A the whole document.

International Search Report and Written Opinion—PCT/US2010/054334—International Search Authority, European Patent Office,Dec. 28, 2010.

ISO/IEC 14996-12 International Standard, "Information technology-Coding of audio-visual objects Part 12: ISO base media file format," Oct. 1, 2005, 94 pp.

Nokia Corporation: "Static HTTP Streaming"3GPP Draft; S4-AHI071_Static_HTTP_Streaming, 3rd Generation Partnership Project (3GPP), 20,23, Mobile Competence Centre ; 650, Route Des Lucioles ; F-06921 Sophia-Antipolis Cedex ; France, no. Seattle, WA, USA; Oct. 1, 2009, XP050398762, [retrieved on Sep. 29, 2009].

Nokia Corp., "Usage of 'mfra' box for Random Access and Seeking," S4-AHI127, 3GPP TSG-SA4 Ad-Hoc Meeting, Dec. 14th-16th, 2009, Paris, FR, 2 pp.

Qualcomm Europe S A R L: "Baseline Architecture and Definitions for HTTP Streaming", 36PP Draft; S4-090603_HTTP_Streaming_Architecture, 3rd Generation Partnership Project (3GPP), Mobile Competence Centre ; 650, Route Des Lucioles ; F-06921 Sophia-Antipolis Cedex ; France, no. Kista; Aug. 12, 2009, XP050356889, [retrieved on Aug. 12, 2009].

Research in Motion UK Limited: "Use of Metadata for Client Controlled Adaptation of HTTP", 3GPP Draft; S4-090648, 3rd Generation Partnership Project (3GPP), Mobile Competence Centre ; 650, Route Des Lucioles ; F-06921 Sophia-Antipolis Cedex ; France, no. Kista; Aug. 12, 2009, XP050356925, [retrieved on Aug. 12, 2009] the whole document.

Stockhammer et al., "WD 0.1 of 23001-6 Dynamic Adaptive Streaming over HTTP (DASH)," ISO/IEC JTC1/SC29/WG11, Coding of Moving Pictures and Audio, Geneva, Switzerland, Aug. 11, 2010.

Taiwan Search Report—TW099137056—TIPO—Sep. 16, 2013.

3GPP, "Transparent end-to-end packet switched streaming service (PSS): 3GPP file format (3GP)," 3GPP TS 26.244, version 9.0.0, Release 9, Sophia Antipolis, Valbonne, FR, 55 pp., 2010.

3GPP, "Transparent end-to-end packet-switched streaming service (PSS): Protocols and codecs (Release 9)," 3GPP TS 26.234, version 9.1 .0, Release 9, Sophia Antipolis, Valbonne, FR, 179 pp., 2009.

Catalan et al., "Rate Adaptation in 3GPP Video Streaming Using Track Switching Over a Multihop WLAN," Technical University of Catalonia, IEEE 2009, pp. 13-18.

Cranley, "Perceptual Quality Adaptation (PQA) Algorithm for 3GP and Multi-Tracked MPEG-4 Content Over Wireless IP Networks," 2004 IEEE 15th International Symposium on Personal, Indoor and Mobile Radio Communications, 6 pp.

Stockhammer, T., "Permanent Document for PSS and MBMS Extensions", V.0.0.4, .0.4, 3GPP TSG-SA WG4 MBS and Video Adhoc Meeting S4-AHI0942, Oct. 10, 2009, URL, http://www.3gpp.org/ftp/TSG_SA/WG4_CODEC/Ad-hoc_MBS/Docs_AHI/S4-AHI094.zip.

* cited by examiner

US 8,938,767 B2

STREAMING ENCODED VIDEO DATA

This application is a continuation of U.S. patent application Ser. No. 12/785,770, filed May 24, 2010, which claims the benefit of U.S. Provisional Application No. 61/255,767, filed Oct. 28, 2009, the entire contents of each of which are hereby expressly incorporated by reference.

TECHNICAL FIELD

This disclosure relates to transport of encoded video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

After video data has been encoded, the video data may be packetized by a multiplexer for transmission or storage. The MPEG-2 standard, for example, includes a "Systems" section that defines a transport level for many video encoding standards. MPEG-2 transport level systems may be used by MPEG-2 video encoders, or other video encoders conforming to different video encoding standards. For example, the MPEG-4 standard prescribes different encoding and decoding methodologies than those of MPEG-2, but video encoders implementing the techniques of the MPEG-4 standard may still utilize the MPEG-2 transport level methodologies. Third Generation Partnership Project (3GPP) also provides techniques for transporting encoded video data using a particular multimedia container format for the encoded video data.

SUMMARY

In general, this disclosure describes techniques for supporting streaming transport of encoded video data via a network protocol such as, for example, hypertext transfer protocol (HTTP). A source device may form a media presentation description (MPD) file that lists multiple presentations of encoded media data. Each presentation corresponds to different encoding for a common video. For example, each presentation may have different expectations of a destination device in terms of encoding and/or rendering capabilities, as well as various average bit rates.

The source device may signal the characteristics of each presentation, allowing a destination device to select one of the presentations based on the decoding and rendering capabilities of the destination device and to switch between different presentations based on the network environment variation and the bandwidths of the presentations. The presentations may be pre-encoded or real-time encoded and stored in a server as file(s) or file fragments, compliant to e.g., ISO base media file format and its extensions. The destination device may retrieve data from one or more of the presentations at various times over, for example, HTTP. The source device may further signal fragments of each presentation, such as byte ranges and corresponding temporal locations of video fragments within each presentation, such that destination devices may retrieve individual video fragments from various presentations based on e.g., HTTP requests.

In one example, a method for transporting encoded video data includes receiving, by a source video device, encoded video data comprising a number of video segments, forming a presentation comprising a number of video files, each of the video files corresponding to a respective one of the video segments, and, in response to a request specifying a temporal section of the video data, outputting at least one of the video files corresponding to the number of video segments of the requested temporal section.

In another example, an apparatus for transporting encoded video data includes a management unit configured to receive encoded video data comprising a number of video segments and forms a presentation comprising a number of video files, each of the video files corresponding to a respective one of the video segments, and a network interface configured to, in response to a request specifying a temporal section of the video data, output at least one of the video files corresponding to the number of video segments of the requested temporal section.

In another example, an apparatus for transporting encoded video data includes means for receiving encoded video data comprising a number of video segments, means for forming a presentation comprising a number of video files, each of the video files corresponding to a respective one of the video segments, and means for outputting, in response to a request specifying a temporal section of the video data, at least one of the video files corresponding to the number of video segments of the requested temporal section.

In another example, a computer-readable storage medium comprises instructions that, when executed, cause a processor of a source device for transporting encoded video data to receive encoded video data comprising a number of video segments, form a presentation comprising a number of video files, each of the video files corresponding to a respective one of the video segments, and, in response to a request specifying a temporal section of the video data, output at least one of the video files corresponding to the number of video segments of the requested temporal section.

In still another example, a method for retrieving encoded video data includes retrieving, by a client device, presentation description data that describes characteristics of a presentation of video data, wherein the video data comprises a number of video segments, and wherein the presentation comprises a number of video files, each of the video files corresponding to a respective one of the video segments, submitting a request specifying a temporal section of the video data to a source device, receiving, in response to the request, at least one of the video files corresponding to the number of video segments of the requested temporal section from the source device, and decoding and displaying the at least one of the video files.

In another example, an apparatus for retrieving encoded video data includes a network interface, a control unit configured to retrieve, via the network interface, presentation description data that describes characteristics of a presentation of video data, wherein the video data comprises a number of video segments, and wherein the presentation comprises a number of video files, each of the video files corresponding to a respective one of the video segments, to submit a request specifying a temporal section of the video data to a source device, and to receive, in response to the request, at least one of the video files corresponding to the number of video segments of the requested temporal section from the source device, a video decoder configured to decode the at least one of the video files, and a user interface comprising a display configured to display the decoded at least one of the video files.

In another example, an apparatus for retrieving encoded video data includes means for retrieving presentation description data that describes characteristics of a presentation of video data, wherein the video data comprises a number of video segments, and wherein the presentation comprises a number of video files, each of the video files corresponding to a respective one of the video segments, means for submitting a request specifying a temporal section of the video data to a source device, means for receiving, in response to the request, at least one of the video files corresponding to the number of video segments of the requested temporal section from the source device, and means for decoding and displaying the at least one of the video files.

In another example, a computer-readable storage medium comprises instructions that, when executed, cause a processor of a device for retrieving encoded video data to retrieve presentation description data that describes characteristics of a presentation of video data, wherein the video data comprises a number of video segments, and wherein the presentation comprises a number of video files, each of the video files corresponding to a respective one of the video segments, submit a request specifying a temporal section of the video data to a source device, receive, in response to the request, at least one of the video files corresponding to the number of video segments of the requested temporal section from the source device, cause a video decoder of the client device to decode the at least one of the video files, and cause a user interface of the client device to display the at least one of the decoded video files.

The details of one or more examples are set forth in the accompanying drawings and the description below. Other features, objects, and advantages will be apparent from the description and drawings, and from the claims.

DETAILED DESCRIPTION

Figure 1:
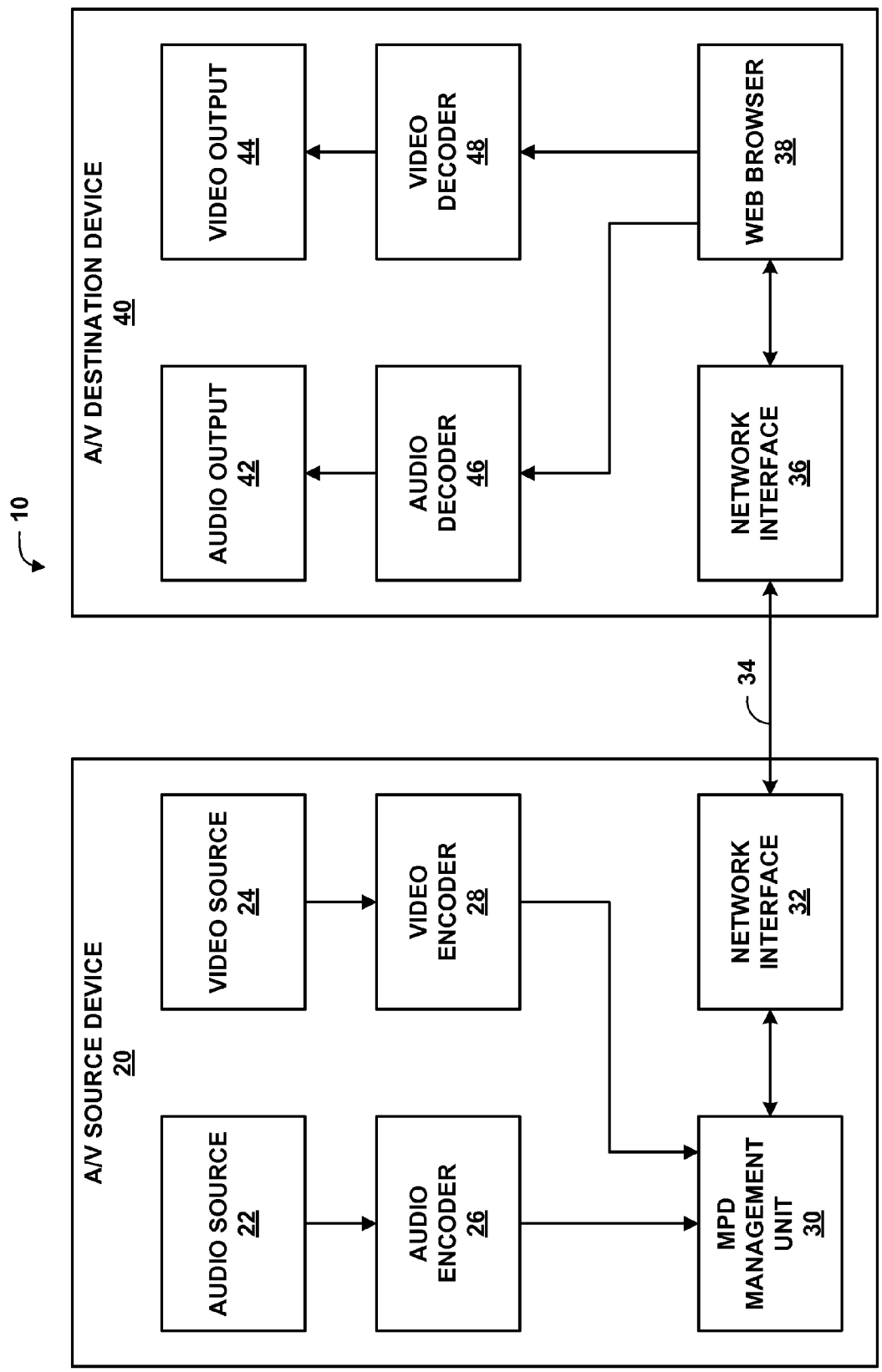
FIG. 1 is a block diagram illustrating an example system in which an audio/video (A/V) source device transports audio and video data to an A/V destination device.

The techniques of this disclosure are generally directed to supporting streaming transport of video data using a protocol, such as, for example, hypertext transfer protocol (HTTP) and the HTTP streaming application of HTTP. In general, references to HTTP may include references to HTTP streaming in this disclosure. This disclosure provides a media presentation description (MPD) file that signals characteristic elements of a number of presentations of video data such as, for example, where fragments of video data are stored within the presentations. Each presentation may include a number of individual files, e.g., third Generation Partnership Project (3GPP) files. In general, each presentation may include a set of individual characteristics, such as, for example, a bit rate, frame rate, resolution, interlaced or progressive scan type, encoding type (e.g., MPEG-1, MPEG-2, H.263, MPEG-4/H.264, H.265, etc.), or other characteristics.

Each of the 3GPP files can be individually stored by a server and individually retrieved by a client, e.g., using HTTP GET and partial GET requests. HTTP GET and partial GET requests are described in R. Fielding et al., "Hypertext Transfer Protocol—HTTP/1.1," Network Working Group, RFC2616, June 1999, available at http://tools.ietf.org/html/rfc2616. In accordance with the techniques of this disclosure, 3GPP files of each presentation may be aligned such that they correspond to the same section of video, that is, the same set of one or more scenes. Moreover, a server may name corresponding 3GPP files of each presentation using a similar naming scheme. In this manner, an HTTP client may easily change presentations as network conditions change. For example, when a high amount of bandwidth is available, the client may retrieve 3GPP files of a relatively higher quality presentation, whereas when a lower amount of bandwidth is available, the client may retrieve 3GPP files of a relatively lower quality presentation.

This disclosure also provides techniques for signaling characteristics of presentations and corresponding 3GPP files summarized in an MPD file. As an example, this disclosure provides techniques by which a server may signal characteristics such as, for example, an expected rendering capability and decoding capability of a client device for each presentation. In this manner, a client device can select between the various presentations based on decoding and rendering capabilities of the client device. As another example, this disclosure provides techniques for signaling an average bit rate and maximum bit rate for each presentation. In this manner, a client device can determine bandwidth availability and select between the various presentations based on the determined bandwidth.

In accordance with the techniques of this disclosure, a server may use a naming convention that indicates 3GPP files of each presentation that correspond to the same scene. This disclosure provides techniques for aligning 3GPP files of each presentation such that each scene corresponds to one of the 3GPP files in each presentation. For example, a server may name 3GPP files of each presentation corresponding to a scene lasting from time T to time T+N using a naming convention similar to "[program]_preX_T_T+N" where T and T+N in the naming convention correspond to values for time T and time T+N, "[program]" corresponds to the name of the video, and "_preX" corresponds to an identifier of the presentation (e.g., "pre2" for presentation 2). Accordingly, the 3GPP files of each presentation may be aligned such that the file sizes of the 3GPP files in the same time period can be used to derive the instantaneous bit rate for each presentation.

In addition, the server may signal the starting time as well as the ending time and/or duration of each of the 3GPP files for each presentation. In this manner, a client can retrieve a particular 3GPP file using an HTTP GET based on the name of the file by retrieving the starting time and ending time of the 3GPP file as signaled by the server and automatically generating the file name based on the starting time and ending time. In addition, the server may also signal byte ranges for each of the 3GPP files of each presentation. Accordingly, the client may retrieve all or a portion of a 3GPP file using a partial GET based on the automatically generated name and a byte range of the 3GPP file to be retrieved. The client may use the HEAD method of HTTP to retrieve the file size of a particular 3GPP file. In general, a HEAD request retrieves header data without corresponding body data for a URN or URL to which the HEAD request is directed.

FIG. 1 is a block diagram illustrating an example system 10 in which audio/video (A/V) source device 20 transports audio and video data to A/V destination device 40. System 10 of FIG. 1 may correspond to a video teleconference system, a server/client system, a broadcaster/receiver system, gaming system, or any other system in which video data is sent from a source device, such as A/V source device 20, to a destination device, such as A/V destination device 40. In some examples, audio encoder 26 may comprise a voice encoder, also referred to as a vocoder.

A/V source device 20, in the example of FIG. 1, includes audio source 22, video source 24, audio encoder 26, video encoder 28, media presentation description (MPD) management unit 30, and network interface 32. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit for computer graphics, or any other source of video data. Raw audio and video data may comprise analog or digital data. Analog data may be digitized before being encoded by audio encoder 26 and/or video encoder 28.

Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data and/or to archived, pre-recorded audio and video data.

Audio frames that correspond to video frames are generally audio frames containing audio data that was captured by audio source 22 contemporaneously with video data captured by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time. Audio data may also be added separately, e.g., soundtrack information, added sounds, music, sound effects, and the like.

Audio encoder 26 may encode a timestamp in each encoded audio frame that represents a time at which the audio data for the encoded audio frame was recorded, and similarly, video encoder 28 may encode a timestamp in each encoded video frame that represents a time at which the video data for encoded video frame was recorded. In such examples, an audio frame corresponding to a video frame may comprise an audio frame comprising a timestamp and a video frame comprising the same timestamp. A/V source device 20 may include an internal clock from which audio encoder 26 and/or video encoder 28 may generate the timestamps, or that audio source 22 and video source 24 may use to associate audio and video data, respectively, with a timestamp.

Audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 and video encoder 28 provide encoded data to MPD management unit 30. In general, MPD management unit 30 stores summarization regarding encoded audio and video data in the form of MPD files corresponding to the encoded audio and video data in accordance with the techniques of this disclosure. As discussed in greater detail below, an MPD file describes a number of presentations, each presentation having a number of video files, e.g., formed as Third Generation Partnership Project (3GPP) files. MPD management unit 30 may create the same number of 3GPP files in each presentation and may align the 3GPP files of each presentation such that similarly positioned 3GPP files correspond to the same video segment. That is, similarly positioned 3GPP files may correspond to the same temporal video fragment. MPD management unit 30 may also store data that describes characteristics of the 3GPP files of each presentation, such as, for example, the durations of the 3GPP files.

MPD management unit 30 may interact with network interface 32 to provide video data to a client, such as A/V destination device 40. Network interface 32 may implement HTTP (or other network protocols) to allow destination device 40 to request individual 3GPP files listed in an MPD file which is stored by MPD management unit 30. Network interface 32 may therefore respond to HTTP GET requests for 3GPP files, partial GET requests for individual byte ranges of 3GPP files, HEAD requests to provide header information for the MPD and/or 3GPP files, and other such requests. Accordingly, network interface 32 may deliver data to destination device 40 that is indicative of characteristics of an MPD file, such as, for example, a base name for the MPD file, characteristics of presentations of the MPD file, and/or characteristics of 3GPP files stored in each presentation. Data that describe characteristics of a presentation of an MPD file, the MPD file itself, and/or 3GPP files corresponding to the MPD file may be referred to as "presentation description data." In some examples, network interface 32 may instead comprise a network interface card (NIC) that extracts application-layer data from received packets and then passes the application-layer packets to MPD management unit 30. In some examples, MPD management unit 30 and network interface 32 may be functionally integrated.

In this manner, a user may interact with destination device 40 via a web browser 38 application executed on destination device 40, in the example of FIG. 1, to retrieve video data. Web browser 38 may initially retrieve a first video file or its fragments from one of the presentations stored by MPD management unit 30, then retrieve subsequent video files or fragments as the first video file is being decoded and displayed by video decoder 48 and video output 44, respectively. Destination device 40 may include a user interface that includes video output 44, e.g., in the form of a display, and audio output 42, as well as other input and/or output devices such as, for example, a keyboard, a mouse, a joystick, a microphone, a touchscreen display, a stylus, a light pen, or other input and/or output devices. When the video files include audio data, audio decoder 46 and audio output 42 may decode and present the audio data, respectively. Moreover, a user may "seek" to a particular temporal location of a video presentation. For example, the user may seek in the sense that the user requests a particular temporal location within the video data, rather than watching the video file in its entirety from start to finish. The web browser may cause a processor or other processing unit of destination device 40 to determine one of the video files that includes the temporal location of the seek, then request that video file from source device 20.

In some examples, a control unit within destination device 40 may perform the functionality of web browser 38. That is, the control unit may execute instructions for web browser 38 to submit requests to source device 20 via network interface 36, to select between presentations of an MPD file, and to determine available bandwidth of network connection 34. The instructions for web browser 38 may be stored in a computer-readable storage medium. The control unit may further form requests, e.g., HTTP GET and partial GET requests, for individual 3GPP files from source device 20, as described in this disclosure. The control unit may comprise a general purpose processor and/or one or more dedicated hardware units such as, for example, ASICs, FPGAs, or other hardware or processing units or circuitry. The control unit may further, in some examples, perform the functionality of any of audio decoder 46, video decoder 48, and/or any other functionality described with respect to destination device 40.

In general, presentations of an MPD file differ by characteristics such as, for example, expected rendering capabilities of a destination device, expected decoding capabilities of a destination device, and average bit rate for video files of the presentations. MPD management unit 30 may signal the expected rendering capabilities, expected decoding capabilities, and average bitrates for the presentations in presentation headers of the MPD file. In this manner, destination device 40 may determine which of the presentations from which to retrieve video files, for example, based on rendering capabilities of video output 44 and/or decoding capabilities of video decoder 48.

Destination device 40 may further determine current bandwidth availability, e.g., of network connection 34, and select a presentation based on the average bit rate for the presentation. That is, when video output 44 and video decoder 48 have the capability to render and decode, respectively, video files of more than one of the presentations of an MPD file, destination device 40 may select one of the presentations based on current bandwidth availability. Likewise, when the bandwidth availability changes, destination device 40 may dynamically change between supported presentations. For example, when bandwidth becomes restricted, destination device 40 may retrieve a next video file from a presentation having relatively lower bit rate video files, whereas when bandwidth expands, destination device 40 may retrieve a next video file from a presentation having relatively higher bit rate video files.

By temporally aligning the video files of each presentation, the dynamic switch between presentations may be simplified for destination devices such as destination device 40. That is, destination device 40 may, upon determining that bandwidth conditions have changed, determine a time period for which video data has already been retrieved, and then retrieve the next video file from one of the presentations based on the bandwidth conditions. For example, if the last video file retrieved by destination device 40 ends at time T, and the next file is of duration N, destination device 40 may retrieve the video file from time T to time T+N from any of the presentations, based on the bandwidth conditions, because the video files of each of the presentations are temporally aligned.

Moreover, MPD management unit 30 and web browser 38 may be configured with a common naming convention for video files. In general, each video file (e.g., each 3GPP file) may comprise a name based on a uniform resource locator (URL) at which the MPD file is stored, a uniform resource name (URN) of the MPD file at the URL, a name of a presentation, a start time, and an end time. Thus both MPD management unit 30 and web browser 38 may be configured to use a naming scheme such as, for example: "[URL]/[URN]_pre[X]_[start time]_[end time]" where [URL] is substituted with the URL of the MPD file, [URN] is substituted with the URN of the MPD file, X is substituted with the number of the presentation, [start time] is substituted with the start time of the 3GPP file being requested, and [end time] is substituted with the end time of the 3GPP file being requested. In other examples, the name may be based on the position of the 3GPP file within the presentation. For example, for 3GPP file M, the name of the 3GPP file may be automatically generated as "[URL]/[URN]_pre[X]_[M]." Web browser 38 may, in some examples, submit an HTTP partial GET request for a file by, for example, specifying the file using the naming scheme above, as well as a byte range of the file. Web browser 38 may utilize the HTTP HEAD method to retrieve the size of a file specified, for example, using the naming scheme above.

Thus, for example, for an MPD file having the URL "www.qualcomm com" and a URN of "program1," to retrieve the 3GPP file of presentation 3 starting at 10:02 and ending at 10:05, web browser 38 may submit an HTTP GET request for "www.qualcomm com/program1_pre3_10:02_10:05." As a further example, if presentation 2 has a relatively higher bit rate than presentation 3, and destination device 40 determines that available bandwidth has increased, after retrieving the previous example 3GPP file, web browser 38 may next submit an HTTP GET request for "www.qualcomm com/program1_pre2_10:05_10:08."

In general, each 3GPP file may be independently decodable. Each 3GPP file may include, for example, at least one intra-coded picture. For example, each 3GPP file may comprise one or more groups of pictures (GOPs) or superframes, where at least one key frame for the GOPs or superframes is encoded using an intra-mode encoding. In this manner, web browser 38 may retrieve a 3GPP file from any of the presentations of an MPD file and decode the retrieved 3GPP file without reference to other 3GPP files of the same presentation. For example, when web browser 38 determines that available bandwidth has increased, web browser 38 may request a next 3GPP file from a presentation having a relatively higher average bit rate than a current presentation, without retrieving temporally earlier 3GPP files of the presentation having the higher average bit rate.

In this manner, source device 20 may provide video data in the form of MPD files to destination devices, such as destination device 40. In some examples, source device 20 may comprise a web server. Destination device 40 may comprise any device capable of retrieving data via, for example, HTTP, such as, for example, a computer or a mobile device such as a cellular telephone with Internet access. Source device 20 may implement the techniques of this disclosure to transport encoded video data to destination device 40, and to signal characteristics of the encoded video data. The encoded video data may be encoded using any of a variety of different standards such as, for example, MPEG-1, MPEG-2, H.263, H.264/MPEG-4, H.265, or other encoding standards.

The ITU-T H.264 standard, as one example, supports intra prediction in various block sizes, such as 16 by 16, 8 by 8, or 4 by 4 for luma components, and 8×8 for chroma components, as well as inter prediction in various block sizes, such as 16×16, 16×8, 8×16, 8×8, 8×4, 4×8 and 4×4 for luma components and corresponding scaled sizes for chroma components. In this disclosure, "N×N" and "N by N" may be used interchangeably to refer to the pixel dimensions of the block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks of video data need not be square, e.g., may comprise N×M pixels where N is not equal to M.

Block sizes that are less than 16 by 16 may be referred to as partitions of a 16 by 16 macroblock. Video blocks may comprise blocks of pixel data in the pixel domain, or blocks of transform coefficients in the transform domain, e.g., following application of a transform such as a discrete cosine transform (DCT), an integer transform, a wavelet transform, or a conceptually similar transform to the residual video block data representing pixel differences between coded video blocks and predictive video blocks. In some cases, a video block may comprise blocks of quantized transform coefficients in the transform domain.

Smaller video blocks can provide better resolution, and may be used for locations of a video frame that include high levels of detail. In general, macroblocks and the various partitions, sometimes referred to as sub-blocks, may be considered video blocks. In addition, a slice may be considered to be a plurality of video blocks, such as macroblocks and/or sub-blocks. Each slice may be an independently decodable unit of a video frame. Alternatively, frames themselves may be decodable units, or other portions of a frame may be defined as decodable units. The term "coded unit" or "coding unit" may refer to any independently decodable unit of a video frame such as an entire frame, a slice of a frame, a group of pictures (GOP) also referred to as a sequence, or another independently decodable unit defined according to applicable coding techniques.

The term macroblock refers to a data structure for encoding picture and/or video data according to a two-dimensional pixel array that comprises 16×16 pixels. Each pixel comprises a chrominance component and a luminance component. Accordingly, the macroblock may define four luminance blocks, each comprising a two-dimensional array of 8×8 pixels, two chrominance blocks, each comprising a two-dimensional array of 16×16 pixels, and a header comprising syntax information, such as a coded block pattern (CBP), an encoding mode (e.g., intra- (I), or inter- (P or B) encoding modes), a partition size for partitions of an intra-encoded block (e.g., 16×16, 16×8, 8×16, 8×8, 8×4, 4×8, or 4×4), or one or more motion vectors for an inter-encoded macroblock.

Video encoder 28, video decoder 48, audio encoder 26, audio decoder 46, and MPD management unit 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined audio encoder/decoder (CODEC). An apparatus including video encoder 28, video decoder 48, audio encoder 26, audio decoder 46, MPD management unit 30, and/or hardware executing an application for web browser 38 may comprise an integrated circuit, a microprocessor, and/or a wireless communication device, such as a cellular telephone.

Figure 2:
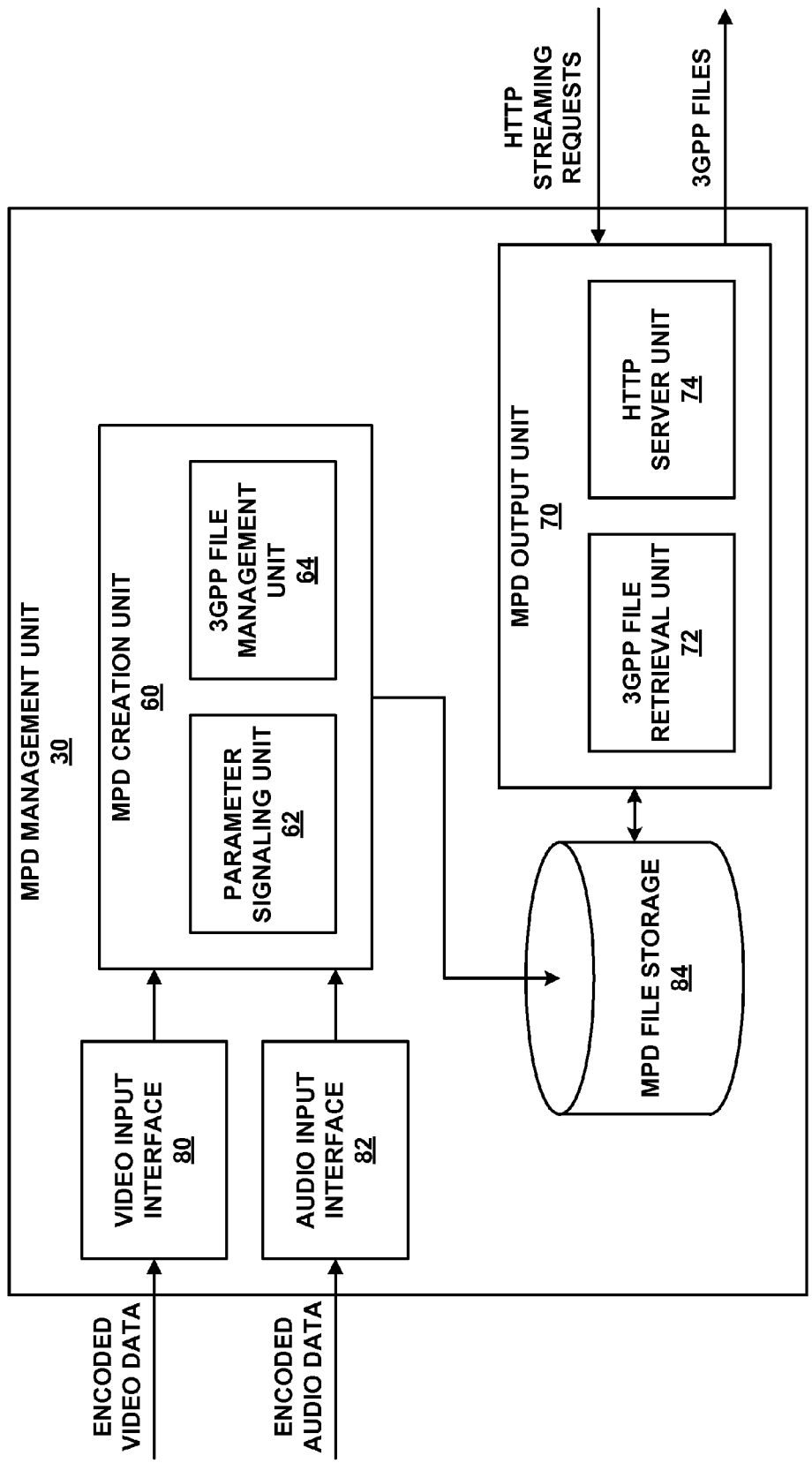
FIG. 2 is a block diagram illustrating an example arrangement of components of a multiplexer.

FIG. 2 is a block diagram illustrating an example arrangement of components of MPD management unit 30 (FIG. 1). In the example of FIG. 2, MPD management unit 30 includes MPD creation unit 60, video input interface 80, audio input interface 82, MPD file storage 84, and MPD output unit 70. MPD creation unit 60 includes parameter signaling unit 62 and 3GPP file management unit 64, while MPD output unit 70 includes 3GPP file retrieval unit 72 and HTTP server unit 74, in the example of FIG. 2.

Video input interface 80 and audio input interface 82 receive encoded video and audio data, respectively. Video input interface 80 and audio input interface 82 may receive encoded video and audio data as the data is encoded, or may retrieve encoded video and audio data from a computer-readable medium. Upon receiving encoded video and audio data, video input interface 80 and audio input interface 82 pass the encoded video and audio data to MPD creation unit 60 for assembly into an MPD file.

MPD creation unit 60 receives the encoded audio and video data to create MPD files. MPD creation unit 60 may receive video data encoded in a variety of different ways, e.g., different sizes (resolutions) of video data, video data encoded according to a variety of encoding standards, video data encoded at various frame rates and/or bitrates, or other variations. MPD creation unit 60 may receive encoded video data for each of the various presentations to be stored within an MPD file.

3GPP file management unit 64 may create individual 3GPP files for each presentation of an MPD file such that the 3GPP files of each presentation are temporally aligned. That is, the first 3GPP file in each presentation corresponds to the same video fragment with the same duration, starting time, and ending time. 3GPP files corresponding to the same video fragment having the same start time and end time are referred to as corresponding 3GPP files. Because presentations may have various frame rates, corresponding 3GPP files of the presentations may include different numbers of encoded pictures. Likewise, because the encoding methodologies and bitrates may differ between the presentations, corresponding 3GPP files may have different file sizes.

In some examples, 3GPP file management unit 64 may construct 3GPP files for each presentation such that each 3GPP file has the same temporal duration. In these examples, parameter signaling unit 62 may signal the duration of all 3GPP files for an MPD file using one value representative of the common duration. In other examples, 3GPP file management unit 64 may construct the 3GPP files such that corresponding 3GPP files between the presentations have the same duration, but the 3GPP files within a presentation may have individual durations. In such examples, parameter signaling unit 62 may signal the duration for each 3GPP file. Parameter signaling unit 62 may also signal the starting time, ending time, and/or duration of each 3GPP file for a presentation.

Parameter signaling unit 62 may also signal other characteristics of an MPD file, 3GPP files included within the MPD file, and the presentations of the MPD file. For example, parameter signaling unit 62 may signal expected decoding capabilities of a decoder of a destination device for each presentation. The decoding capabilities may include, for example, decoding methodologies such as the encoding standard used to encode the video data of the presentation, a minimum macroblock decoding rate, a minimum frame decoding rate, a frame or block buffer size, and/or other expected decoding capabilities. In some examples, parameter signaling unit 62 may signal the expected decoding capabilities using a profile indicator (profile IDC) value and a level indicator (level IDC) value.

In the context of video coding standards, a "profile IDC" value may correspond to a subset of algorithms, features, or tools and constraints that apply to them. As defined by the H.264 standard, for example, a "profile IDC" value describes a subset of the entire bitstream syntax that is specified by the H.264 standard. A "level IDC" value describes the limitations of the decoder resource consumption, such as, for example, decoder memory and computation, which are related to the resolution of the pictures, bit rate, and macroblock (MB) processing rate.

Parameter signaling unit 62 may also signal expected rendering capabilities for each presentation. For example, parameter signaling unit 62 may signal a picture width, picture height, and/or frame rate for each presentation.

MPD management unit 30 may store created MPD files, along with 3GPP files for each presentation and signaled characteristics for the MPD file, the presentations, and each 3GPP file, to MPD file storage 84. MPD file storage 84 may comprise a computer-readable storage medium such as, for example, a hard disk, a solid state drive, magnetic tape, optical storage media, or any other storage medium or combination thereof.

MPD output unit 70 may receive and respond to HTTP requests from destination devices such as, for example, destination device 40. In the example of FIG. 2, it is assumed that network interface 32 (FIG. 1) extracts application-layer data, which may include HTTP requests, from received network packets and passes the extracted application-layer data to MPD management unit 30. MPD output unit 70 generally determines what the received request is requesting, retrieves the requested data from MPD file storage 84, and provides the requested data back to the requesting device, e.g., destination device 40.

HTTP server unit 74, in this example, implements HTTP to receive and interpret HTTP requests, such as GET, partial GET, and HEAD requests. Although this disclosure describes the example of HTTP, for purposes of illustration, other network protocols may also be used with the techniques described in this disclosure.

HTTP server unit 74 may interpret received HTTP requests to determine data requested by the requests. The request may specify, for example, a particular 3GPP file or portion of a particular 3GPP file, header data that describes characteristics of the MPD file, presentations of the MPD file, and/or 3GPP files of a presentation, or other data of an MPD. HTTP server unit 74 may then pass an indication of the requested data to 3GPP file retrieval unit 72. 3GPP file retrieval unit 72 may retrieve the requested data from MPD file storage 84 and return the retrieved data to HTTP server unit 74, which may package the data into one or more HTTP packets and send the packets to network interface 32. Network interface 32 may then encapsulate the HTTP packets and output the packets to, e.g., destination device 40.

When parameter signaling unit 62 signals starting times and durations of 3GPP files for an MPD file, destination devices such as destination device 40 may determine 3GPP files that correspond to one another of various presentations of an MPD file. For example, HTTP server unit 74 may respond to HTTP HEAD requests with data that describes characteristics of an MPD file, one or more presentations of the MPD file, and/or one or more 3GPP files of the presentations of the MPD file. Destination device 40 may also retrieve the file sizes of corresponding 3GPP files to derive instantaneous bitrates for each presentation, e.g., by dividing the file sizes by the temporal duration of the video segment to which the 3GPP files correspond.

Bandwidth adaptation in streaming via HTTP may be implemented as follows. At a particular time T, destination device 40 may switch to the stream (e.g., presentation) with the closest bit rate but smaller than a desired bit rate. Instantaneous bit rate of a presentation can be calculated by mapping time T to a current 3GPP file of a current presentation. To do so, assuming each 3GPP file has the same temporal length deltaT, destination device may calculate an identifier M for the 3GPP file as M=T/deltaT. Destination device 40 may then generate a file name for the 3GPP file and retrieve the length of the 3GPP file as uiFileLength.

Destination device 40 may also retrieve a temporal duration for the 3GPP file from the MPD file. This temporal duration may be designated uiDuration, which is assumed to be described in seconds in this example. Destination device 40 may then calculate the instantaneous bit rate as bit rate=8.0*uiFileLength/uiDuration/100, which results in the value of bit rate having units of kbps. By checking every bit rate value for each presentation of the same scene, the value that is closest to but smaller than a desired bit rate. The corresponding presentation can then be the target presentation to which destination device 40 should switch. That is, destination device 40 may begin retrieving 3GPP files from the target presentation.

Furthermore, HTTP server unit 74 may be configured to recognize 3GPP files based on a particular naming scheme, such as "[URN]_pre[X]_[start time]_[end time]" where [URN] is substituted with the URN of the MPD file, X is substituted with the number of the presentation, [start time] is substituted with the start time of the 3GPP file being requested, and [end time] is substituted with the end time of the 3GPP file being requested. Thus, HTTP server unit 74 may, in response to a request that identifies a 3GPP file using this naming scheme, send 3GPP file retrieval unit 72 an indication to retrieve the 3GPP file corresponding to the MPD file identified by [URN] from presentation _pre[X] having a start time of [start time] and an end time of [end time]. Likewise, 3GPP file retrieval unit 72 may retrieve this requested 3GPP file. Destination device 40 may automatically generate the name of 3GPP files for inclusion in the request based on the start time and end time of the 3GPP files, as well as the presentation from which to retrieve the 3GPP files.

In some examples, HTTP server unit 74 may receive an HTTP partial GET request that specifies a byte range of a file identified according to the naming scheme above. HTTP server unit 74 may provide an indication of the byte range of the file to 3GPP file retrieval unit 72, which may retrieve only the data of the file corresponding to the requested byte range and provide the retrieved data to HTTP server unit 74. HTTP server unit 74 may similarly encapsulate this data and send the data to network interface 32, which may further encapsulate the data and transmit the data via connection 34.

Although in the example of FIG. 2 MPD management unit is shown as including both MPD creation unit 60 and MPD output unit 70, in other examples, separate devices may be configured to perform the functionality attributed to MPD creation unit 60 and MPD output unit 70. For example, a first device may be configured to encapsulate encoded video data in the form of an MPD file, and signal parameters of the MPD file, while a second device may be configured as a web server to provide access to the MPD files created by the first device. Likewise, an encoding device separate from source device 20 may encode raw video data and send the encoded video data to MPD management unit 30 of source device 20. In general, any of the functionality attributed to source device 20 may be included in common or separate devices and/or units of the devices. MPD file storage 84 may, in some examples, correspond to an external storage device, such as, for example, an external hard drive or an external file server.

Figure 3:
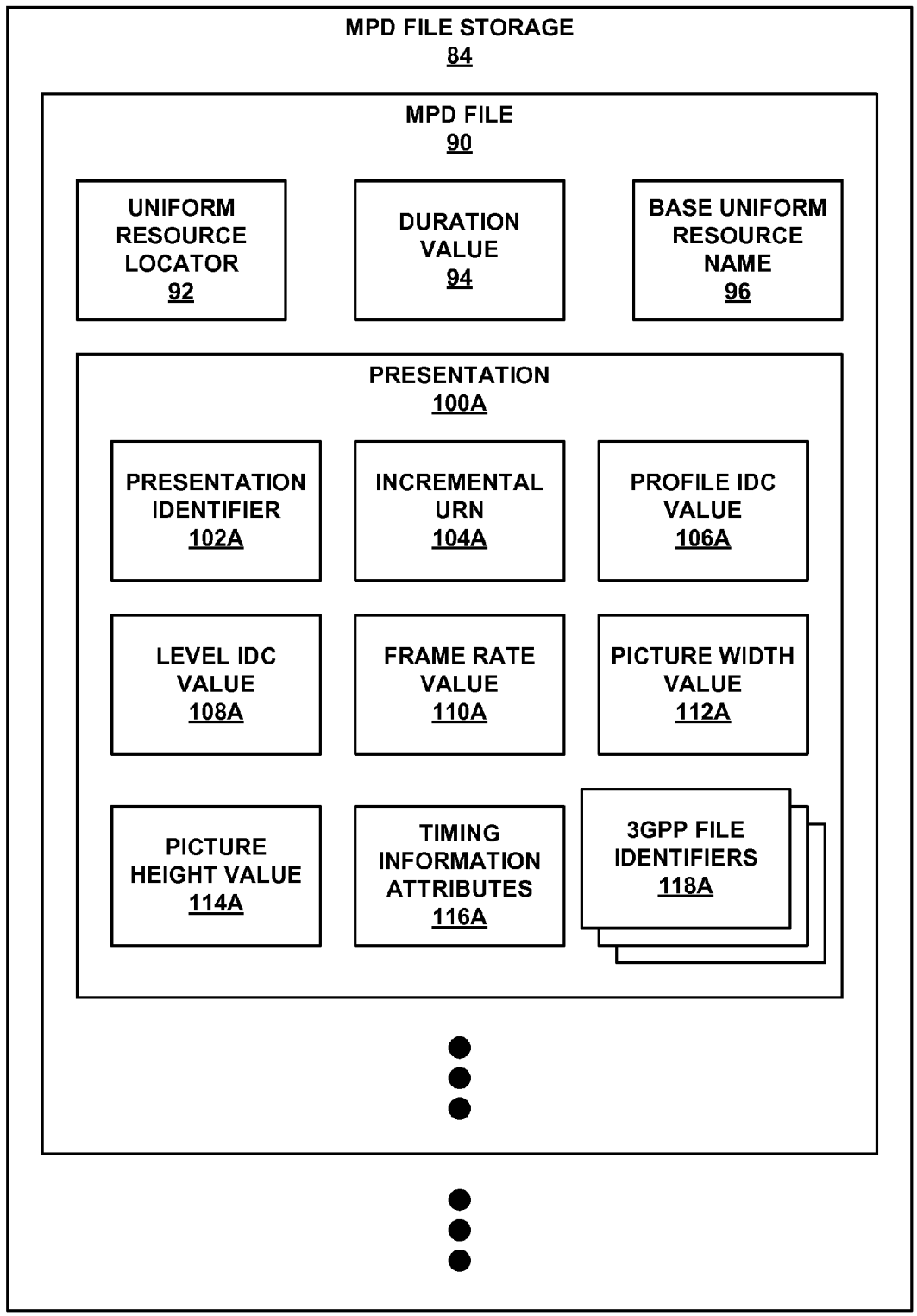
FIG. 3 is a block diagram illustrating an example set of program specific information tables.

FIG. 3 is a block diagram illustrating data stored within an example MPD file 90. Parameter signaling unit 62 may signal information for MPD file 90, such as, for example, uniform resource locator (URL) value 92 that represents the URL at which the MPD is stored (e.g., "www.qualcomm com/media"), duration value 94 that represents the temporal duration of the video data for MPD file 90, and a base uniform resource name (URN) value 96 that corresponds to the name of MPD file 90, e.g., "program1." MPD file 90 includes a number of presentations similar to the example of presentation 100A. For the example of presentation 100A of MPD file 90, parameter signaling unit 62 may signal presentation identifier 102A, incremental URN 104A (e.g., "_preX") that a destination device may use to refer to presentation 100A, expected decoding capability values including, e.g., profile IDC value 106A and level IDC value 108A, and expected rendering capability values including, e.g., frame rate value 110A, picture width value 112A, and/or picture height value 114A.

Parameter signaling unit 62 may also signal timing information for presentations such as presentation 100A. Timing information attributes 116A may include, for example, a number of entries in the presentations (which should be equal for each presentation), durations of 3GPP files corresponding to 3GPP file identifiers 118A, and a number of 3GPP files having the same duration. In some examples, parameter signaling unit 62 may signal this data for only one presentation (e.g., presentation 100A), although the data may be presumed to be the same for each of the other presentations. The following pseudocode may describe a portion of a data structure that may be used to signal timing characteristics of a presentation:

```
timing info. attributes
unsigned int (32) number_entry;
for (i =0 ; i < number_entry ; i++) {
    unsigned int (32) deltaT;
    unsigned int (32) numFileWithSameDuration;
}
```

In the example pseudocode, "number_entry" represents the number of continuous group of 3GPP files for the same presentation. Parameter signaling unit 62 may set the number_entry value to 1 when all the durations of the movie fragments are the same. The value "deltaT" represents the duration of the 3GPP file in the i-th entry of the continuous group of 3GPP files. The value "numFileWithSameDuration" represents the number of continuous 3gp files in the i-th entry. Parameter signaling unit 62 may set the value off "numFileWithSameDuration" equal to 0 to indicate that all the 3GPP files in the presentation have the same duration of deltaT. For examples corresponding to live streaming, parameter signaling unit 62 may set the "number_entry" value to 1, to indicate that every 3GPP file has the same duration.

Presentation 100A also includes a number of 3GPP file identifiers 118A, which correspond to 3GPP files constructed by 3GPP file management unit 64. Each of presentations 100 of MPD file 90 may include the same number of 3GPP files, which may be temporally aligned.

Using this signaled data, destination device 40 may automatically generate names of 3GPP files in order to submit HTTP GET and partial GET requests. That is, destination device 40 may automatically generate the URN for 3GPP files. For example, assuming that base URN 96 of MPD file 90 is "program 1," and that presentation identifier 102A of presentation 100A is "_pre2," then the common part of the URN of 3GPP files corresponding to 3GPP file identifiers 118A is "program1_pre2." For the Mth one of 3GPP file identifiers 118A in presentation 100A, in this example, destination device 40 may submit an HTTP GET request for "program1_pre2_M." For example, to retrieve the 45th 3GPP file, destination device 40 may submit an HTTP GET request for "program1_pre2_45.3gp." Alternatively, destination device 40 may submit an HTTP GET request for "program1_pre2_Mstart_Mend," where Mstart corresponds to the start time of the Mth one of 3GPP files corresponding to 3GPP file identifiers 118A and Mend corresponds to the end time of the Mth one of the 3GPP files corresponding to 3GPP file identifiers 118A.

An HTTP client, such as destination device 40, may also seek to a time T of a presentation, such as presentation 100A. To retrieve the Mth one of the 3GPP files corresponding to 3GPP file identifiers 118A that corresponds to seek time T, destination device 40 may calculate M as M=T/deltaT, where deltaT may be signaled within timing information attributes 116A, as described above, assuming that each of the 3GPP files have the same duration. On the other hand, if the 3GPP files do not have the same duration, destination device 40 may retrieve the durations for each of the 3GPP files to determine which one of the 3GPP files corresponding to 3GPP file identifiers 118A to retrieve. After calculating M, destination device 40 may retrieve the Mth one of the 3GPP files corresponding to 3GPP file identifiers 118A.

When 3GPP files of each of presentations 100 are temporally aligned, destination device 40 may substitute the identifier of any one of presentations 100 for "_pre2" in the example above to retrieve 3GPP files from any of the presentations. As an example, suppose MPD file 90 has five presentations, and that destination device 40 is capable of decoding and rendering any of presentations 2, 3, or 4. Assume further that presentation 2 has a relatively low quality (and hence low average bitrate), presentation 3 has a higher quality and higher average bit rate, and presentation 4 has an even higher quality and even higher average bit rate. Initially, destination device 40 may determine that the available bandwidth is relatively low, so may retrieve 3GPP file "1" from presentation 2, e.g., using an HTTP GET request for "program1_pre2_1.3gp." Destination device 40 may then determine that available bandwidth has increased, and so retrieve the next 3GPP file using an HTTP GET request for "program1_pre3_2.3gp." Destination device 40 may then determine that the available bandwidth has increased even further, and so retrieve the next 3GPP file using an HTTP GET request for "program 1_pre4_3.3gp."

Figure 4:
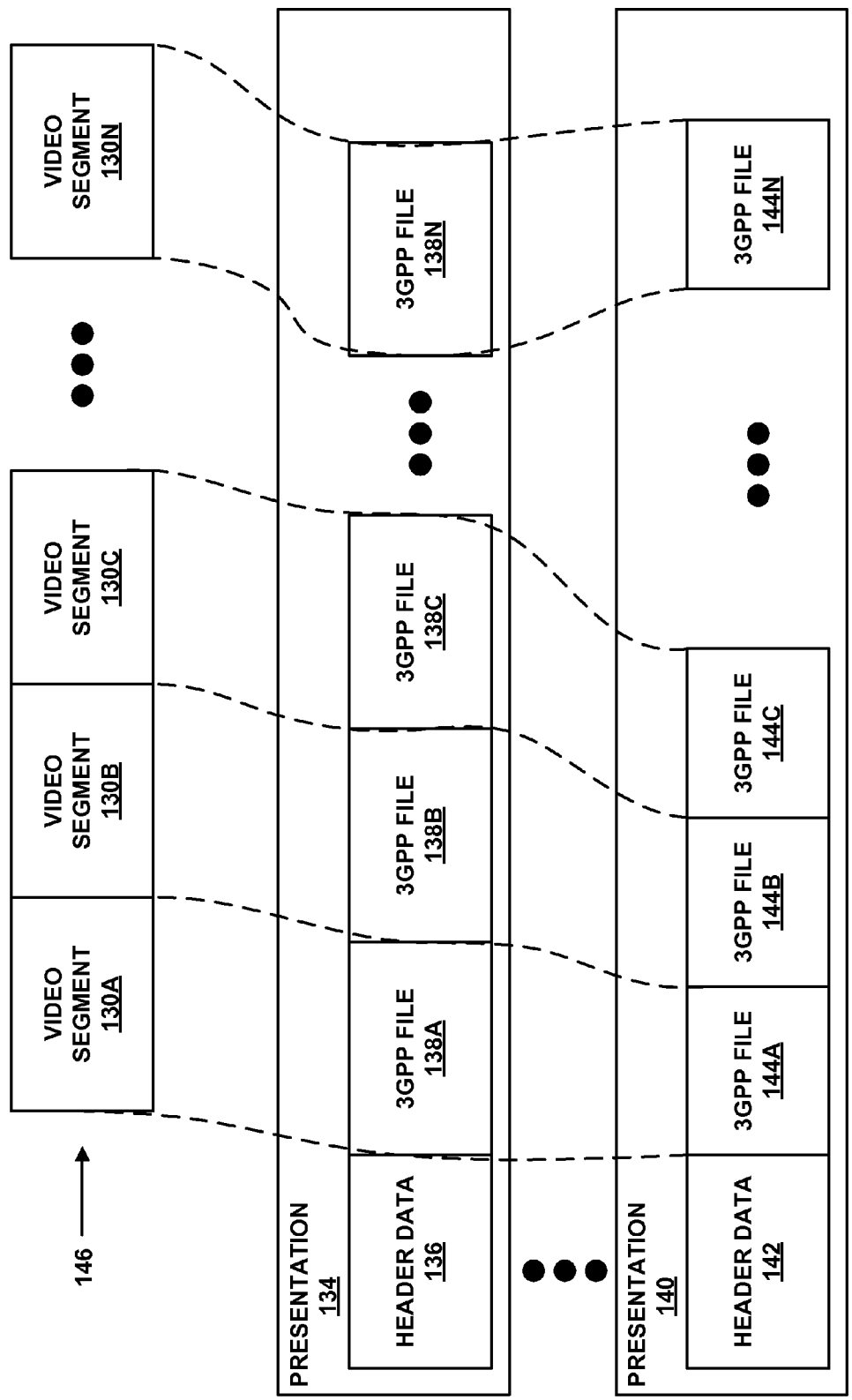
FIG. 4 is a conceptual diagram illustrating alignment between Third Generation Partnership Project (3GPP) files of various presentations and corresponding video segments.

FIG. 4 is a conceptual diagram illustrating alignment betbrween 3GPP files 138, 144 of various presentations 134, 140 and video segments 130 of video 146. Video 146 includes video segments 130A-130N (video segments 130). The example of FIG. 4 illustrates presentations 134 and 140 in this example, and may include additional presentations, as indicated by the ellipses between presentations 134 and 140. Presentation 134 includes header data 136 and 3GPP files 138A-138N (3GPP files 138). Presentation 140 includes header data 142 and 3GPP files 144A-144N (3GPP files 144).

Although 3GPP files 138 are different in size than 3GPP files 144, 3GPP files 138 and 3GPP files 144 are temporally aligned with video segments 130 of video 146. In the example of FIG. 4, 3GPP file 138A and 3GPP file 144A correspond to video segment 130A, 3GPP file 138B and 3GPP file 144B correspond to video segment 130B, 3GPP file 138C and 3GPP file 144C correspond to video segment 130C, and 3GPP file 138N and 3GPP file 144N correspond to video segment 130N. That is, 3GPP file 138A and 3GPP file 144A, for example, include video data that, although potentially encoded and/or rendered differently, generally correspond to the same scenes as video segment 130A.

Header data 136, 142 may generally include data descriptive of presentations 134, 140, respectively. Header data 136, 142 may include data similar to presentation identifier 102A, incremental URN 104A, profile IDC value 106A, level IDC value 108A, frame rate value 110A, picture width value 112A, picture height value 114A, and timing information attributes 116A of FIG. 3. An MPD file describing 3GPP files 138, 144 of presentations 134-140 may also include header data (not shown) that describes characteristics of the MPD file, presentations 134, 140, and 3GPP files 138, 144.

In this manner, destination device 40 (FIG. 1) may retrieve header data 136, 142 to determine whether destination device 40 is capable of decoding and displaying video data of 3GPP files 138 and/or 3GPP files 144. Assuming that destination device 40 is able to decode and render data from both 3GPP files 138 and 3GPP files 144, destination device 40 may select between presentation 134 and presentation 140 based on bandwidth availability. For example, assuming presentation 134 has a lower average bitrate than presentation 140, destination device 40 may initially retrieve 3GPP file 138A from presentation 134 when bandwidth availability is relatively low. Assuming then that destination device 40 determines that bandwidth availability has increased, destination device 40 may next retrieve 3GPP file 144B. Because 3GPP files 138A and 144A are temporally aligned, destination device 40 may decode and render encoded video data of 3GPP files 144B seamlessly, such that a user of destination device 40 is able to see video segment 130A followed immediately by video segment 130B, albeit with potentially varying qualities.

Figure 5:
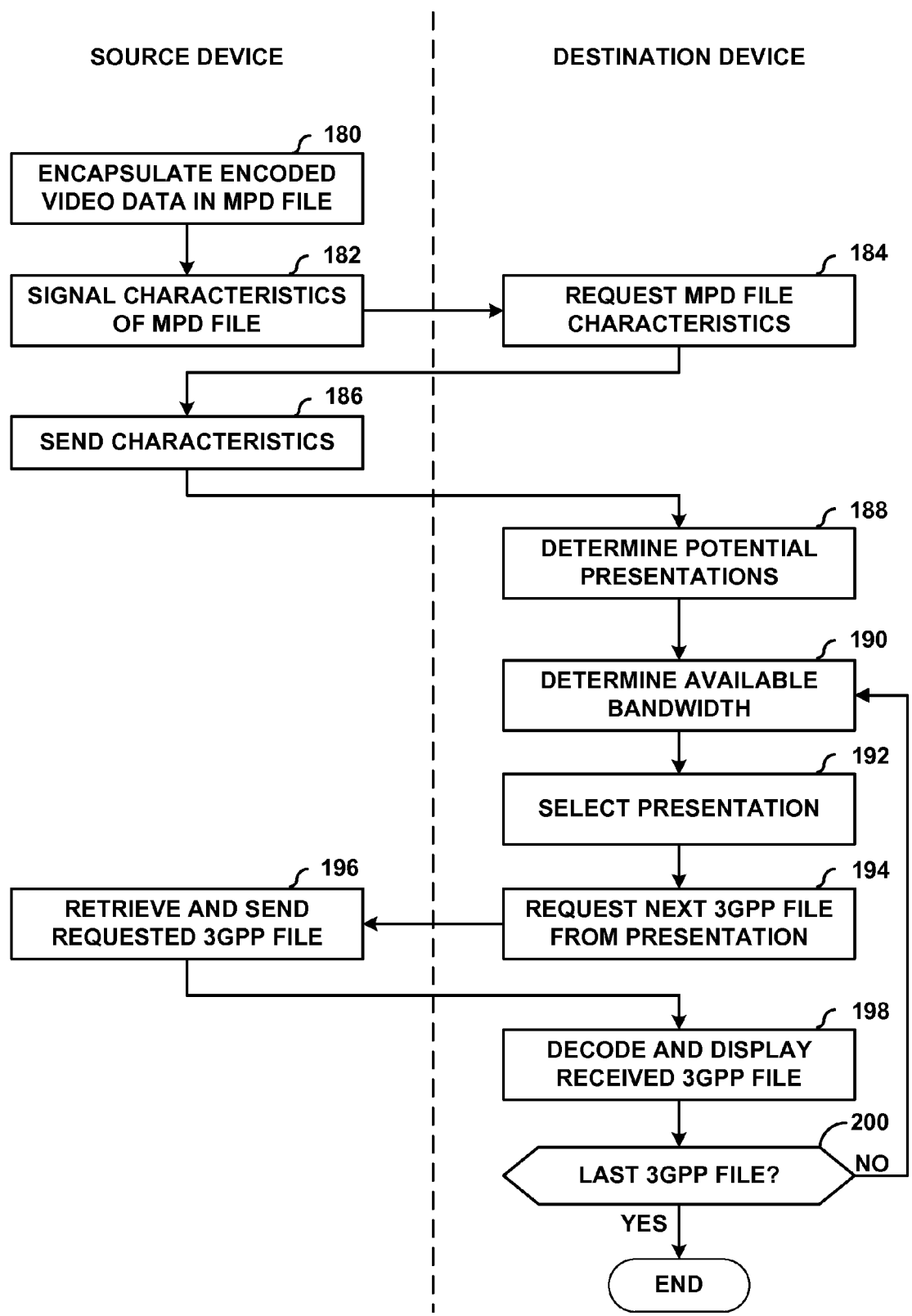
FIG. 5 is a flowchart illustrating an example method for transporting encoded video data from a source device to a destination device.

FIG. 5 is a flowchart illustrating an example method for transporting encoded video data from a source device to a destination device. For purposes of example, the method of FIG. 5 is explained with respect to source device 20 and destination device 40, although it should be understood that other devices may be configured to perform the method of FIG. 5.

In the example of FIG. 5, source device 20 receives encoded video data corresponding to various video segments of a video. Source device 20 encapsulates the encoded video data in an MPD file (180). For example, source device 20 may determine encoded video frames of a variety of different presentations that correspond to a common video segment, as shown in FIG. 4, and encapsulate the video frames in one or more respective 3GPP files of various presentations. Source device 20 may also signal characteristics of the MPD file, the presentations, and 3GPP files in header portions of the MPD file, the presentations, and/or the 3GPP files (182). The characteristics may correspond to the example characteristics illustrated in FIG. 3.

A user of destination device 40 may initially retrieve the MPD file from a link on a web page or from an embedded video of the web page, e.g., using web browser 38 (FIG. 1). Destination device 40 may request characteristics of the MPD file after the user has requested to view the video (184). For example, destination device 40 may issue an HTTP HEAD request to source device 20 for a particular MPD file. In response, source device 20 may provide data indicative of the characteristics of the MPD file (186). This data may indicate, for example, the number of presentations for the MPD file, decoding capabilities and rendering capabilities for each presentation that are expected for destination device 40 to be able to decode and render the 3GPP files of the respective presentation, average bitrates for each presentation, a duration of the 3GPP files for the presentations (when each of the 3GPP files have the same duration), durations of each of the 3GPP files for one or more of the presentations (when the 3GPP files can have different durations within a presentation but are temporally aligned between different presentations), incremental uniform resource names for each presentation, or other characteristics of the MPD file.

Destination device 40 may analyze the expected decoding and rendering capabilities to determine which of the presentations can be decoded and rendered by destination device 40 (188). For example, destination device 40 may determine whether video decoder 48 satisfies a profile IDC value and a level IDC value indicated by the expected decoding capabilities in the received MPD file characteristics. Destination device 40 may also determine whether video output 44 is capable of displaying video data at the frame rate indicated by the expected rendering capabilities value, and whether the size of video output 44 matches the picture height and/or picture width values of the expected rendering capabilities value. In some examples, video decoder 48 and/or video output 44 may upsample or downsample decoded pictures in order to properly fit within the size of video output 44. Likewise, video decoder 48 and/or video output 44 may interpolate or decimate (or skip) frames of decoded video data to match a refresh rate of video output 44. Destination device 40 may record indications of which presentations of the MPD file can be decoded and rendered in a local computer-readable storage medium, e.g., random access memory (RAM) of destination device 40.

Destination device 40 may then determine a relative amount of bandwidth of a network between itself and source device 20 (190). Destination device 40 may generally use any known techniques for estimating available bandwidth to determine the amount of bandwidth that is available. For example, destination device 40 may estimate, additionally or alternatively, round trip delay (e.g., by issuing an Internet Control Message Protocol (ICMP) ping request to source device 20), average packet corruption or packet loss (e.g., by analyzing lost or corrupted packets according to Transmission Control Protocol (TCP) statistics), or other network performance metrics.

Destination device 40 may then select one of the presentations from which to begin retrieving 3GPP files (192). Destination device 40 may select the one of the presentations for which video decoder 48 satisfies the expected decoding capabilities and for which video output 44 satisfies the expected rendering capabilities. When destination device 40 is capable of decoding and rendering encoded video data of more than one presentation, destination device 40 may select from among these potential presentations based on the determined amount of bandwidth by comparing the average bitrates of the presentations to each other. Destination device 40 may be configured with a function that positively relates average bitrate to available bandwidth, such that destination device 40 selects a presentation having a relatively lower average bitrate when available bandwidth is low, but selects a presentation having a relatively higher average bitrate when available bandwidth is high.

After selecting a presentation, destination device 40 may request a 3GPP file from the presentation (194). Destination device 40 may select the first 3GPP file or a 3GPP file including a seeked-to time (that is, a temporal location corresponding to a position at which a user requested to seek within the video data). To request the 3GPP file, destination device may construct an HTTP GET request specifying a URL of source device 20, a URN of the MPD file, a presentation identifier, and a 3GPP file identifier. The 3GPP file identifier may correspond to a numeric identifier of the 3GPP file or include at least one of a starting time and/or an ending time. In some examples, destination device 40 may construct a partial GET request, e.g., when the 3GPP file including the time to which the user seeks is relatively long (e.g., near 60 seconds).

After receiving the HTTP GET or partial GET request, source device 20 may retrieve and send the requested 3GPP file (or portion of the requested 3GPP file) (196). Source device 20 may send the 3GPP file in one or more HTTP packets to destination device 40. Each of the HTTP packets may be further encapsulated, e.g., according to TCP/IP. After receiving and reassembling the requested 3GPP file, destination device 40 may decode and display the 3GPP file (198). That is, web browser 38 of destination device 40 may send the 3GPP file to video decoder 48 for decoding, which may send the decoded video data to video output 44 for display.

Destination device 40 may then determine whether the decoded and displayed video file was the last 3GPP file of the video (200). Destination device 40 may determine that the 3GPP file was last when the end of the video has been reached or when a user elects to stop watching the video. If the decoded and displayed video file was not the last video file ("NO" branch of 200), destination device 40 may reevaluate the available bandwidth (190), select a presentation based on the newly determined amount of bandwidth (192), and request a next 3GPP file from the selected presentation (194). On the other hand, if the decoded and displayed video file was the last video file ("YES" branch of 200), the method may end.

Figure 6:
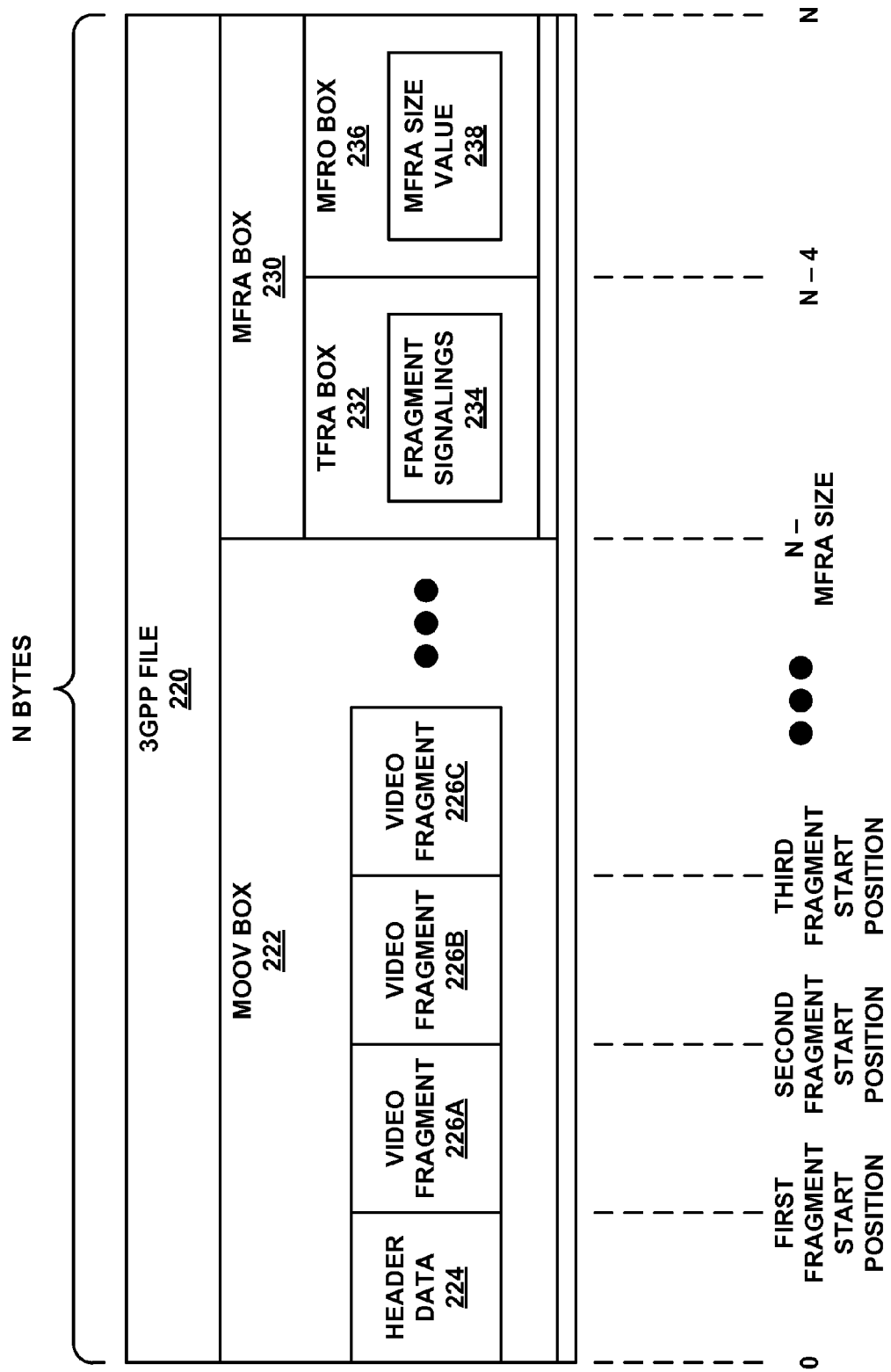
FIG. 6 is a block diagram illustrating elements of an example 3GPP file.

FIG. 6 is a block diagram illustrating elements of an example 3GPP file 220. Destination device 40 may use data from 3GPP file 220 to seek to a requested time within 3GPP file 220. In general, 3GPP files may include video data corresponding to any length of time, e.g., between two seconds and sixty seconds, or even longer or shorter. When the length of time for a 3GPP file is relatively short (e.g., close to two seconds), destination device 40 may be configured to retrieve the entire 3GPP file that includes a seek time, that is, a time of video data at which to begin displaying the video data as requested by, e.g., a user. On the other hand, when the length of time for a 3GPP file is longer (e.g., closer to 60 seconds), destination device 40 may be configured to retrieve a portion of the 3GPP files for decoding and displaying that is close to the seek time, for example, by using an HTTP partial GET request.

3GPP file 220 includes movie (MOOV) box 222 and movie fragment random access (MFRA) box 230. MOOV box 222 generally includes encoded video data, while MFRA box 230 includes descriptive data for assisting with random access of data within MOOV box 222. In the example of FIG. 6, MOOV box 222 includes metadata for the whole file 224 and possibly video fragments 226A-226C (video fragments 226), while MFRA box includes track fragment random access (TFRA) box 232, which includes fragment signalings data 234, and movie fragment random access offset (MFRO) box 236, which includes MFRA size value 238.

MFRA size value 238 describes the length of MFRA box 230 in bytes. In the example of FIG. 6, 3GPP file 220 has N bytes. Destination device 40 may submit an HTTP HEAD request for 3GPP file 220 to determine the length of 3GPP file 220, e.g., the value of N in this example. In general, MFRO box 236 occupies the last four bytes of 3GPP file 220. Accordingly, to determine the length of MFRA box 230, client devices such as destination device 40 may retrieve the last four bytes of 3GPP file 220, e.g., using an HTTP partial GET request that specifies a byte range from [N−4] to N. As MFRO box 236 includes MFRA size value 238, destination device 40 may determine the length of MFRA box 230 after retrieving MFRO box 236.

After determining the length of MFRA box 230 using MFRA size value 238, destination device 40 may retrieve the remaining portion of MFRA box 230. For example, destination device 40 may issue an HTTP partial get for 3GPP file 220 specifying a byte range from [N−MFRA size] to [N−4]. As shown in FIG. 6, this portion includes TFRA box 232, which includes fragment signalings 234. Fragment signalings 234 may specify, for example, temporal locations of video fragments 226.

Header Data 224

Destination device 40 may use fragment signalings 234 to determine which of video fragments 226 to retrieve in order to satisfy a seek request. That is, destination device 40 may determine which one of video fragments 226 includes the time specified in the seek request. Destination device 40 may retrieve header data 224 to determine the byte ranges for each of video fragments 226. After determining which of video fragments 226 includes the time specified in the seek request based on fragment signalings 234, destination device 40 may retrieve the one of video fragments 226 that includes the time specified in the seek request, as well as each of the subsequent video fragments 226.

In some examples, destination device 40 may submit a first partial GET request for the one of video fragments 226 that includes the time specified in the seek request, begin decoding and displaying this video fragment upon receipt, and then submit one or more additional partial GET requests to retrieve the subsequent ones of video fragments 226. In other examples, destination device 40 may submit one partial GET request to retrieve the one of video fragments 226 that includes the time specified in the seek request and each of the subsequent ones of video fragments 226, e.g., by specifying the byte range corresponding to the start of the one of video fragments 226 through [N−MFRA size].

Figure 7:
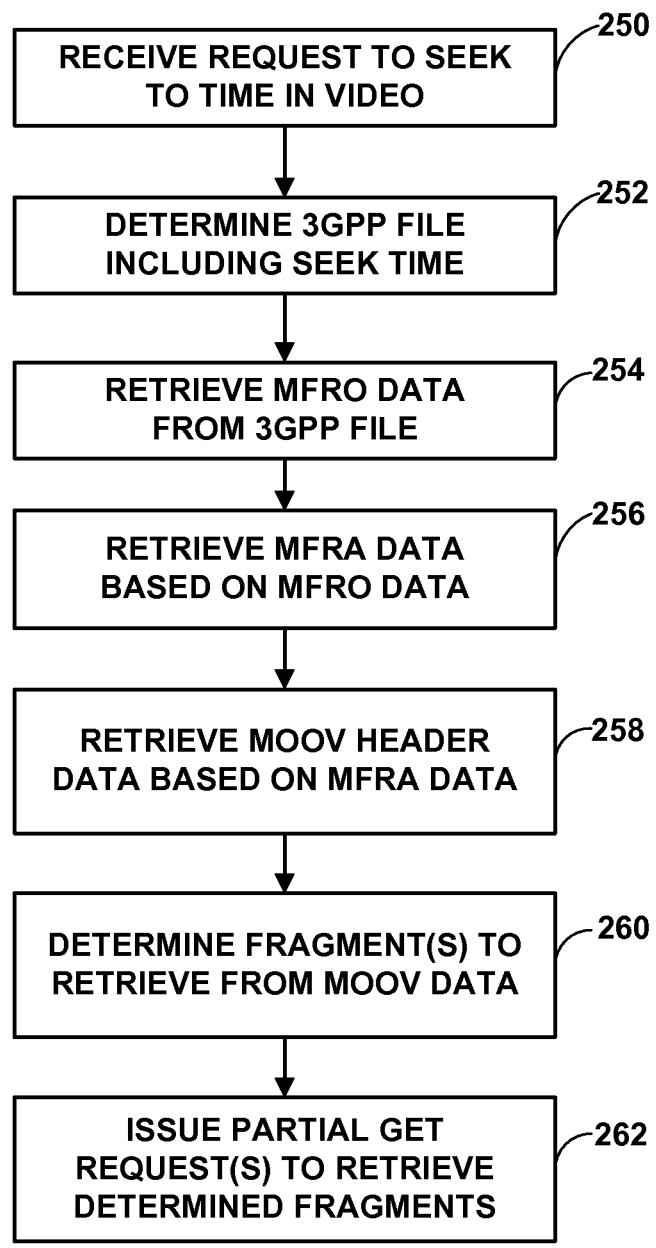
FIG. 7 is a flowchart illustrating an example method for requesting a fragment of a 3GPP file in response to a seek request for a temporal location within the 3GPP file.

FIG. 7 is a flowchart illustrating an example method for requesting a fragment of a 3GPP file in response to a seek request for a time within the 3GPP file. Initially, destination device 40 may receive a request to seek to a particular time within a video (250), e.g., via web browser 38 from a user. For example, the user may select a portion of a scroll bar indicative of the temporal location of video data to request a seek to a particular temporal location.

In response, destination device 40 may determine a 3GPP file of a presentation of an MPD file that includes the seek time (252). That is, destination device 40 may determine one of the 3GPP files of the presentation that has a start time less than the seek time and an end time greater than the seek time. For purposes of illustration, the method of FIG. 7 is discussed with respect to 3GPP file 220 of FIG. 6, which may correspond to any of the 3GPP files corresponding to 3GPP file identifiers 118, 3GPP files 138, or 3GPP files 144. It is assumed that 3GPP file 220 has a start time less than the seek time and an end time greater than the seek time. Destination device 40 may identify 3GPP file 220 based on timing information attributes for 3GPP file 220 stored within a header portion of a presentation that includes 3GPP file 220. The difference between the seek time and the start time of 3GPP file 220 may be referred to as a time offset.

Destination device 40 may then determine a length of 3GPP file 220, e.g., by issuing an HTTP HEAD request that specifies 3GPP file 220 to source device 20. Upon determining the length of 3GPP file 220 in bytes (e.g., N bytes), destination device 40 may issue an HTTP partial GET request that specifies 3GPP file 220 and the byte range of [N−4] to N of 3GPP file 220, to retrieve MFRO box 236 from 3GPP file 220 (254).

As illustrated in the example of FIG. 6, MFRO box 236 includes MFRA size value 238. Thus destination device 40 may use MFRA size value 238, after receiving MFRO box 236, to retrieve the rest of MFRA box 230 (256). That is, destination device 40 may issue an HTTP partial GET for the byte range [N−MFRA size] to [N−4] of 3GPP file 220. In this manner, destination device 40 may retrieve the remaining MFRA data based on the MFRO data. Destination device 40 may also retrieve MOOV header data, e.g., header 224, of MOOV box 222 (258).

Destination device 40 may use data of header 224 and fragment signalings 234 of MFRA box 230 to determine which one of video fragments 226 has a start time that is nearest to the seek time without exceeding the seek time (260). Destination device 40 may then issue one or more HTTP partial GET requests to retrieve the one of video fragments 226 and each of the subsequent video fragments 226 from 3GPP file 220 (262). That is, using indications from header 224 and fragment signalings 232, destination device 40 may determine the starting byte at which the one of video fragments 226 that has a start time that is nearest to the seek time without exceeding the seek time. Destination device 40 may then construct an HTTP partial GET request that specifies this starting byte and either the last byte of this one of video fragments 226 or the end of MOOV box 222, in various examples.

Although the method of FIG. 7 is described with respect to the use of data from MFRA box 230, destination device 40 may use other data to perform a similar technique for extracting video fragments 226 from 3GPP file 222. For example, destination device 40 may determine which of video fragments 226 to extract based on an item location (ILOC) box of a 3GPP file. A 3GPP file may be constructed such that the first four bytes, for example, include an item location offset (ILOO) box, followed immediately by the ILOC. The ILOO box may specify the length of the ILOC box. The ILOO box may be constructed according to the following example pseudocode:

```
aligned(8) class ItemLocationBoxOffset extends FullBox ('iloo', version, 0) {
    unsigned int(32) size;
}
```

In the example pseudocode, ItemLocationBoxOffset describes the name of a new class for the ILOO box. The example specifies a 32-bit integer value "size" that is indicative of the size of the ILOC box. The size value of the ILOC box specified by the ILOO box may include the four bytes of the ILOO box.

The ILOC box may specify a timing information box that indicates timing information of video fragments included within the 3GPP file, e.g., the starting and ending times of each fragment. The timing information may be signaled in an automatic fashion, e.g., to save bits. The ILOC box may further include other descriptive data of the MOOV box of the 3GPP file, e.g., data similar to that stored by header 224 of FIG. 6. The ILOC and ILOO boxes can be used to indicate the timing information of the movie fragments. Thus, destination device 40 may retrieve the video fragments to satisfy a seek request by constructing one or more HTTP partial GET requests based on the data of the ILOC and ILOO boxes.

In particular, destination device 40 may first retrieve the first four bytes of the 3GPP file, which corresponds to the size value for the ILOC box. That is, destination device 40 may first issue an HTTP partial GET request for bytes 0 to 4 of the 3GPP file, to retrieve the ILOO box. By using the size of the ILOC box, specified by the ILOO box, destination device 40 may retrieve the ILOC box, e.g., by issuing an HTTP partial GET request specifying bytes 4 to [ILOC size].

The ILOC box may specify the position and length of a timing information box (also referred to as a following the ILOC box that indicates the byte ranges and temporal locations for each video fragment, e.g., start time, end time, starting byte, and ending byte. Thus, destination device 40 may then retrieve the timing information box based on data of the ILOC box. Destination device 40 may then determine which of the video fragments includes a start time less than the seek time and an end time greater than the seek time, and issue one or more HTTP partial GET requests to retrieve this and subsequent video fragments of the 3GPP file.

The timing information box may be implemented according to the following example pseudocode:

```
aligned(8) class TimeMovieFragment extends FullBox ('tmfr', version = 0, 0) {
    unsigned int (32) number_entry;
    for (i=0; i< number_entry; i++) {
        unsigned int (32) deltaTFragment;
        unsigned int (32) numContinueFragWithSameDuration;
    }
}
```

In the example pseudocode, the "number_entry" value describes the number of continuous movie fragments of the 3GPP file. Number_entry may be set to a value of 1 to indicate that all the durations of the movie fragments are the same. The "deltaTFragment" value generally may describe the duration of the fragments of the i-th entry of the continuous group of movie fragments in the 3GPP file. The "numContinueFragWithSameDuration" value describes the number of continuous movie fragments in the i-th entry. When the "numContinueFragWithSameDuration" value is equal to 0, it indicates that all the 3GPP files in the presentation have the same duration of deltaT.

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media or communication media including any medium that facilitates transfer of a computer program from one place to another. Data storage media may be any available media that can be accessed by one or more computers or one or more processors to retrieve instructions, code and/or data structures for implementation of the techniques described in this disclosure. The phrase "computer-readable storage media" is intended to refer to non-transitory, tangible computer-readable storage media, which may correspond to an article of manufacture. By way of example, and not limitation, such computer-readable media can comprise RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A method of providing information for encoded video data, the method comprising:
 receiving encoded video data units, wherein each of the units corresponds to a video segment;
 determining a first sequence of the units, each of the units in the first sequence having a first common temporal duration;
 providing the first common temporal duration for the first sequence of units and the number of the video data units in the first sequence to a client device, wherein providing comprises providing a first value for the common temporal duration and a second value for the number of the video data units in the first sequence, wherein the first value corresponds to the entire first sequence of units, and wherein the second value corresponds to the entire first sequence of units;
 determining a second sequence of the units, each of the units in the second sequence having a second common temporal duration, wherein the second common temporal duration is different than the first common temporal duration;
 providing the second common temporal duration for the second sequence of units and the number of the video data units in the second sequence to the client device, wherein providing comprises providing a third value for the second common temporal duration and a fourth value for the number of video data units in the second sequence, wherein the third value corresponds to the entire second sequence of units, and wherein the fourth value corresponds to the entire second sequence of units;
 assigning each of the segments of the first sequence and the second sequence a unique uniform resource locator;
 receiving a streaming hypertext transfer protocol (HTTP) request specifying the uniform resource locator of one of the video segments in either the first sequence or the second sequence from the client device; and
 in response to the request, sending the requested video segment to the client device in accordance with streaming HTTP.

2. The method of claim 1, further comprising:
determining a starting time of the first sequence of units; and
providing the starting time of the first sequence of units to the client device.

3. The method of claim 1,
wherein determining the first sequence of the units and the second sequence of the units comprises determining a plurality of sequences of the units, each of the plurality of sequences comprising one or more of the units having a respective common temporal duration, and wherein the plurality of sequences are arranged continuously within a presentation of a video file, and
wherein providing comprises sending the first value, the second value, the third value, and the fourth value as characteristics of the video file to the client device before sending any of the video data units to the client device, and wherein for each of the plurality of sequences, provided information indicates the respective common temporal duration for the corresponding sequence and the number of the video data units in the corresponding sequence.

4. An apparatus for providing information for encoded video data, the apparatus comprising:
 a processor configured to receive encoded video data comprising units of video data, wherein each of the units corresponds to a video segment, determine a first sequence of the units, each of the units in the first sequence having a first common temporal duration, generate the first common temporal duration for the first sequence of video units and the number of the video data units in the first sequence, wherein the processor is configured to generate a first value for the common temporal duration and a second value for the number of the video data units in the first sequence, wherein the first value corresponds to the entire sequence of units, and wherein the second value corresponds to the entire first sequence of units, and wherein the processor is further configured to determine a second sequence of the units, each of the units in the second sequence having a second common temporal duration, wherein the second common temporal duration is different than the first common temporal duration, generate the second common temporal duration for the second sequence of units and the number of the video data units in the second sequence, wherein providing comprises providing a third value for the second common temporal duration and a fourth value for the number of video data units in the second sequence, wherein the third value corresponds to the entire second sequence of units, and wherein the fourth value corresponds to the entire second sequence of units, assign each of the segments of the first sequence and the second sequence a unique uniform resource locator, and receive a streaming hypertext transfer protocol (HTTP) request specifying the uniform resource locator of one of the video segments in either the first sequence or the second sequence from a client device; and a network interface configured to provide the first common temporal duration for the first sequence of video units, the number of the video data units in the first sequence, the second common temporal duration for the second sequence of units, the number of the video data units in the second sequence to the client device, and the requested video segment in accordance with streaming HTTP to the client device.

5. The apparatus of claim 4, wherein the processor is configured to determine a starting time of the first sequence of video units and to generate the starting time of the first sequence of video units, and wherein the network interface is configured to provide the starting time of the first sequence of video units to the client device.

6. The apparatus of claim 4,
wherein the processor is configured to determine a plurality of sequences of the units including the first sequence and the second sequence, each of the sequences comprising one or more of the units having a respective common temporal duration, and wherein the plurality of sequences are arranged continuously within a presentation of a video file, and
wherein the processor is configured to send the first value, the second value, the third value, and the fourth value as characteristics of the video file to the client device before sending any of the video data units of the video file to the client device, and wherein for each of the plurality of sequences, provided information indicates the respective common temporal duration for the corresponding sequence and the number of the video data units in the corresponding sequence.

7. An apparatus for providing information for encoded video data, the apparatus comprising:
means for receiving encoded video data comprising units of video data, wherein each of the units corresponds to a video segment;
means for determining a sequence of the units, each of the units in the first sequence having a first common temporal duration;
means for providing the first common temporal duration for the first sequence of units and the number of the video data units in the first sequence to a client device, wherein the means for providing comprises means for providing a first value for the first common temporal duration and a second value for the number of the video data units in the first sequence, wherein the first value corresponds to the entire first sequence of units, and wherein the second value corresponds to the entire first sequence of units;
means for determining a second sequence of the units, each of the units in the second sequence having a second common temporal duration, wherein the second common temporal duration is different than the first common temporal duration;
means for providing the second common temporal duration for the second sequence of units and the number of the video data units in the second sequence to the client device, wherein providing comprises providing a third value for the second common temporal duration and a fourth value for the number of video data units in the second sequence, wherein the third value corresponds to the entire second sequence of units, and wherein the fourth value corresponds to the entire second sequence of units;
means for assigning each of the segments of the first sequence and the second sequence a unique uniform resource locator;
means for receiving a streaming hypertext transfer protocol (HTTP) request specifying the uniform resource locator of one of the video segments in either the first sequence or the second sequence from the client device; and
means for sending, in response to the request, the requested video segment to the client device in accordance with streaming HTTP.

8. The apparatus of claim 7, further comprising:
means for determining a starting time of the first sequence of units; and
means for providing the starting time of the first sequence of units to the client device.

9. The apparatus of claim 7,
wherein the means for determining the first sequence of the units and the second sequence of units comprises determining a plurality of sequences of the units, each of the plurality of sequences comprising one or more of the units having a respective common temporal duration, and wherein the plurality of sequences are arranged continuously within a presentation of a video file, and
wherein the means for providing comprises means for sending the first value, the second value, the third value, and the fourth value as characteristics of the video file to the client device before sending any of the video data units to the client device, and wherein for each of the plurality of sequences, provided information indicates the respective common temporal duration for the corresponding sequence and the number of the video data units in the corresponding sequence.

10. A computer program product comprising a non-transitory computer readable storage medium having stored therein instructions that, when executed, cause a processor of a device for providing information for encoded video data to:
receive encoded video data comprising units of video data, wherein each of the units corresponds to a video segment;
determine a first sequence of the units, each of the units in the first sequence having a first common temporal duration;
provide the first common temporal duration for the sequence of units and the number of the video data units in the sequence to a client device, wherein the instructions that cause the processor to provide comprise instructions that cause the processor to provide a first value for the first common temporal duration and a second value for the number of the video data units in the first sequence, wherein the first value corresponds to the entire first sequence of units, and wherein the second value corresponds to the entire first sequence of units;

determine a second sequence of the units, each of the units in the second sequence having a second common temporal duration, wherein the second common temporal duration is different than the first common temporal duration;

provide the second common temporal duration for the second sequence of units and the number of the video data units in the second sequence to the client device, wherein providing comprises providing a third value for the second common temporal duration and a fourth value for the number of video data units in the second sequence, wherein the third value corresponds to the entire second sequence of units, and wherein the fourth value corresponds to the entire second sequence of units;

assign each of the segments of the first sequence and the second sequence a unique uniform resource locator;

receive a streaming hypertext transfer protocol (HTTP) request specifying the uniform resource locator of one of the video segments in either the first sequence or the second sequence from the client device; and in response to the request, send the requested video segment to the client device in accordance with streaming HTTP.

11. The computer program product of claim 10, further comprising instructions that cause the processor to:
determine a starting time of the first sequence of units; and
provide the starting time of the first sequence of units to the client device.

12. The computer program product of claim 10,
wherein the instructions that cause the processor to determine the first sequence of the units and the second sequence of the units comprise instructions that cause the processor to determine a plurality of sequences of the units, each of the plurality of sequences comprising one or more of the units having a respective common temporal duration, and wherein the plurality of sequences are arranged continuously within a presentation of a video file, and
wherein the instructions that cause the processor to provide comprise instructions that cause the processor to send the first value, the second value, the third value, and the fourth value as characteristics of the video file to the client device before sending any of the video data units to the client device, and wherein for each of the plurality of sequences, provided information indicates the respective common temporal duration for the corresponding sequence and the number of the video data units in the corresponding sequence.

13. A method of receiving encoded video data, the method comprising:
receiving a first common temporal duration for units in a first sequence of units of encoded video data and the number of the units in the first sequence, comprising receiving a first value for the first common temporal duration and a second value for the number of the video data units in the first sequence, wherein the first value corresponds to the entire first sequence of units, wherein the second value corresponds to the entire first sequence of units, and wherein the units of the first sequence comprise respective video segments;

receiving a second common temporal duration for units in a second sequence of units of encoded video data and the number of the units in the second sequence, comprising receiving a third value for the second common temporal duration and a fourth value for the number of the video data units in the second sequence, wherein the third value corresponds to the entire second sequence of units, wherein the fourth value corresponds to the entire second sequence of units, and wherein the units of the second sequence comprise respective video segments;

receiving one or more indications of a temporal location of the encoded video data at which to begin playback, wherein the temporal location is within the first sequence of units and the second sequence of units, and wherein the one or more indications comprise an indication of either the first sequence of units or the second sequence of units from which to retrieve segments;

determining uniform resource locators of segments of either the first sequence or the second sequence based on the received one or more indications, wherein the uniform resource locators of the segments of the first sequence and of the second sequence are unique;

automatically generating a streaming hypertext transfer protocol (HTTP) request, in accordance with streaming HTTP, to begin a network stream at one of the units in either the first sequence or the second sequence, such that the network stream includes the temporal location, wherein generating the streaming HTTP request comprises specifying one of the determined uniform resource locators in the streaming HTTP request; and sending the streaming HTTP request to a server device.

14. The method of claim 13, wherein receiving comprises receiving from the server device.

15. The method of claim 13, wherein automatically generating the request comprises automatically generating the specified uniform resource locator, comprising:
determining a start time for the one of the units based on the first common temporal duration or the second common temporal duration and the number of the units in the first sequence or the second sequence;
determining an end time for the one of the units based on the first common temporal duration or the second common temporal duration and the number of the units in the first sequence or the second sequence; and
specifying the start time and the end time in the uniform resource locator.

16. The method of claim 15, further comprising calculating the start time for the one of the units based on a starting time of a first representation including the first sequence of units or a second representation including the second sequence of units, the first common temporal duration or the second common temporal duration, and the number of units in the first sequence or the number of units in the second sequence.

17. The method of claim 15, wherein automatically generating the streaming HTTP request further comprises specifying a byte range of the one of the video segments in the video file.

18. An apparatus for receiving encoded video data, the apparatus comprising:
a network interface; and
a processor configured to receive, via the network interface, a first common temporal duration for a first sequence of units of encoded video data and the number of the units in the sequence, wherein the processor is configured to receive a first value for the first common temporal duration and a second value for the number of the video data units in the first sequence, wherein the first value corresponds to the entire first sequence of units, wherein the second value corresponds to the entire second sequence of units, and wherein the units of the first sequence comprise respective video segments, receive a second common temporal duration for units in a second sequence of units of encoded video data and the number of the units in the second sequence, wherein the processor is configured to receive a third value for the second common temporal duration and a fourth value for the number of the video data units in the second sequence, wherein the third value corresponds to the entire second sequence of units, and wherein the fourth value corresponds to the entire second sequence of units, and wherein the units of the second sequence comprise respective video segments, receive one or more indications of a temporal location of the encoded video data at which to begin playback, wherein the temporal location is within the first sequence of units and the second sequence of units, wherein the one or more indications comprise an indication of either the first sequence of units or the second sequence of units from which to retrieve segments, and uniform resource locators of segments of either the first sequence or the second sequence based on the received one or more indications, wherein the uniform resource locators of the segments of the first sequence and of the second sequence are unique, automatically generate a streaming hypertext transfer protocol (HTTP) request, in accordance with streaming HTTP, to begin a network stream at one of the units in either the first sequence or the second sequence, such that the network stream includes the temporal location, specify one of the determined uniform resource locators in the streaming HTTP request, and send the streaming HTTP request to a server device via the network interface.

19. The apparatus of claim 18, wherein the network interface is configured to receive from the server device.

20. The apparatus of claim 18, wherein to automatically generate the request, the processor is configured to determine a start time for the one of the units based on the first common temporal duration or the second common temporal duration and the number of the units in the first sequence or the second sequence, determine an end time for the one of the units based on the first common temporal duration or the second common temporal duration and the number of the units in the first sequence or the second sequence, and specify the start time and the end time in the uniform resource locator.

21. The apparatus of claim 20, wherein the processor is configured to calculate the start time for the one of the units based on a starting time of a first representation including the first sequence of units or a second representation including the second sequence of units, the first common temporal duration or the second common temporal duration, and the number of the units in the first sequence or the number of units in the second sequence.

22. The apparatus of claim 20, wherein to automatically generate the streaming HTTP request, the processor is configured to specify a byte range of the one of the video segments in the video file.

23. An apparatus for receiving encoded video data, the apparatus comprising:
means for receiving a first common temporal duration for units in a first sequence of units of encoded video data and the number of the units in the first sequence, comprising receiving a first value for the first common temporal duration and a second value for the number of the video data units in the first sequence, wherein the first value corresponds to the entire first sequence of units, wherein the second value corresponds to the entire first sequence of units, and wherein the units of the first sequence comprise respective video segments;
means for receiving a second common temporal duration for units in a second sequence of units of encoded video data and the number of the units in the second sequence, comprising means for receiving a third value for the second common temporal duration and a fourth value for the number of the video data units in the second sequence, wherein the third value corresponds to the entire second sequence of units, wherein the fourth value corresponds to the entire second sequence of units, and wherein the units of the second sequence comprise respective video segments;
means for receiving one or more indications of a temporal location of the encoded video data at which to begin playback, wherein the temporal location is within the first sequence of units and the second sequence of units, and wherein the one or more indications comprise an indication of either the first sequence of units or the second sequence of units from which to retrieve segments;
means for determining uniform resource locators of segments of either the first sequence or the second sequence based on the received one or more indications, wherein the uniform resource locators of the segments of the first sequence and of the second sequence are unique;
means for automatically generating a streaming hypertext transfer protocol (HTTP) request, in accordance with streaming HTTP, to begin a network stream at one of the units in either the first sequence or the second sequence, such that the network stream includes the temporal location, wherein generating the streaming HTTP request comprises specifying one of the determined uniform resource locators in the streaming HTTP request; and
means for sending the streaming HTTP request to a server device.

24. The apparatus of claim 23, wherein the means for receiving comprises means for receiving from the server device.

25. The apparatus of claim 23, wherein the means for automatically generating the request comprises means for automatically generating the determined uniform resource locator, the apparatus further comprising:
means for determining a start time for the one of the units based on the first common temporal duration or the second common temporal duration and the number of the units in the first sequence or the second sequence;
means for determining an end time for the one of the units based on the first common temporal duration or the second common temporal duration and the number of the units in the first sequence or the second sequence; and
means for specifying the start time and the end time in the uniform resource locator.

26. The apparatus of claim 25, further comprising means for calculating the start time for the one of the units based on a starting time of a first representation including the first sequence of units or a second representation including the second sequence of units, the first common temporal duration or the second common temporal duration, and the number of units in the first sequence or the number of units in the second sequence.

27. The apparatus of claim 25, wherein the means for automatically generating the streaming HTTP request further comprises means for specifying a byte range of the one of the video segments in the video file.

28. A computer program product comprising a non-transitory computer readable medium having stored thereon instructions that, when executed, cause a processor of a device for receiving encoded video data to:
receive a first common temporal duration for units in a first sequence of units of encoded video data and the number of the units in the first sequence, comprising receiving a first value for the first common temporal duration and a second value for the number of the video data units in the first sequence, wherein the first value corresponds to the entire first sequence of units, wherein the second value corresponds to the entire first sequence of units, and wherein the units of the first sequence comprise respective video segments;
receive a second common temporal duration for units in a second sequence of units of encoded video data and the number of the units in the second sequence, wherein the instructions cause the processor to receive a third value for the second common temporal duration and a fourth value for the number of the video data units in the second sequence, wherein the third value corresponds to the entire second sequence of units, wherein the fourth value corresponds to the entire second sequence of units, and wherein the units of the second sequence comprise respective video segments;
receive one or more indications of a temporal location of the encoded video data at which to begin playback, wherein the temporal location is within the first sequence of units and the second sequence of units, and wherein the one or more indications comprise an indication of either the first sequence of units or the second sequence of units from which to retrieve segments;
determine uniform resource locators of segments of either the first sequence or the second sequence based on the received one or more indications, wherein the uniform resource locators of the segments of the first sequence and of the second sequence are unique;
automatically generate a streaming hypertext transfer protocol (HTTP) request, in accordance with streaming HTTP, to begin a network stream at one of the units in either the first sequence or the second sequence, such that the network stream includes the temporal location, wherein the instructions cause the processor to generate the streaming HTTP request comprises specifying one of the determined uniform resource locators in the streaming HTTP request; and
send the streaming HTTP request to a server device.

29. The computer program product of claim 28, wherein the instructions that cause the processor to receive comprise instructions that cause the processor to receive from the server device.

30. The computer program product of claim 28, wherein the instructions that cause the processor to automatically generate the request comprise instructions that cause the processor to automatically generate the specified uniform resource locator, comprising instructions that cause the processor to:
determine a start time for the one of the units based on the first common temporal duration or the second common temporal duration and the number of the units in the first sequence or the second sequence;
determine an end time for the one of the units based on the first common temporal duration or the second common temporal duration and the number of the units in the first sequence or the second sequence; and
specify the start time and the end time in the uniform resource locator.

31. The computer program product of claim 30, further comprising instructions that cause the processor to calculate the start time for the one of the units based on a starting time of a first representation including the first sequence of units or a second representation including the second sequence of units, the first common temporal duration or the second common temporal duration, and the number of units in the first sequence or the number of units in the second sequence.

32. The computer program product of claim 30, wherein the instructions that cause the processor to automatically generate the streaming HTTP request further comprise instructions that cause the processor to specify a byte range of the one of the video segments in the video file.

\* \* \* \* \*